Sept. 25, 1951 C. E. ADAMS ET AL 2,569,214
HYDRAULIC APPARATUS
Filed May 8, 1948 22 Sheets-Sheet 1
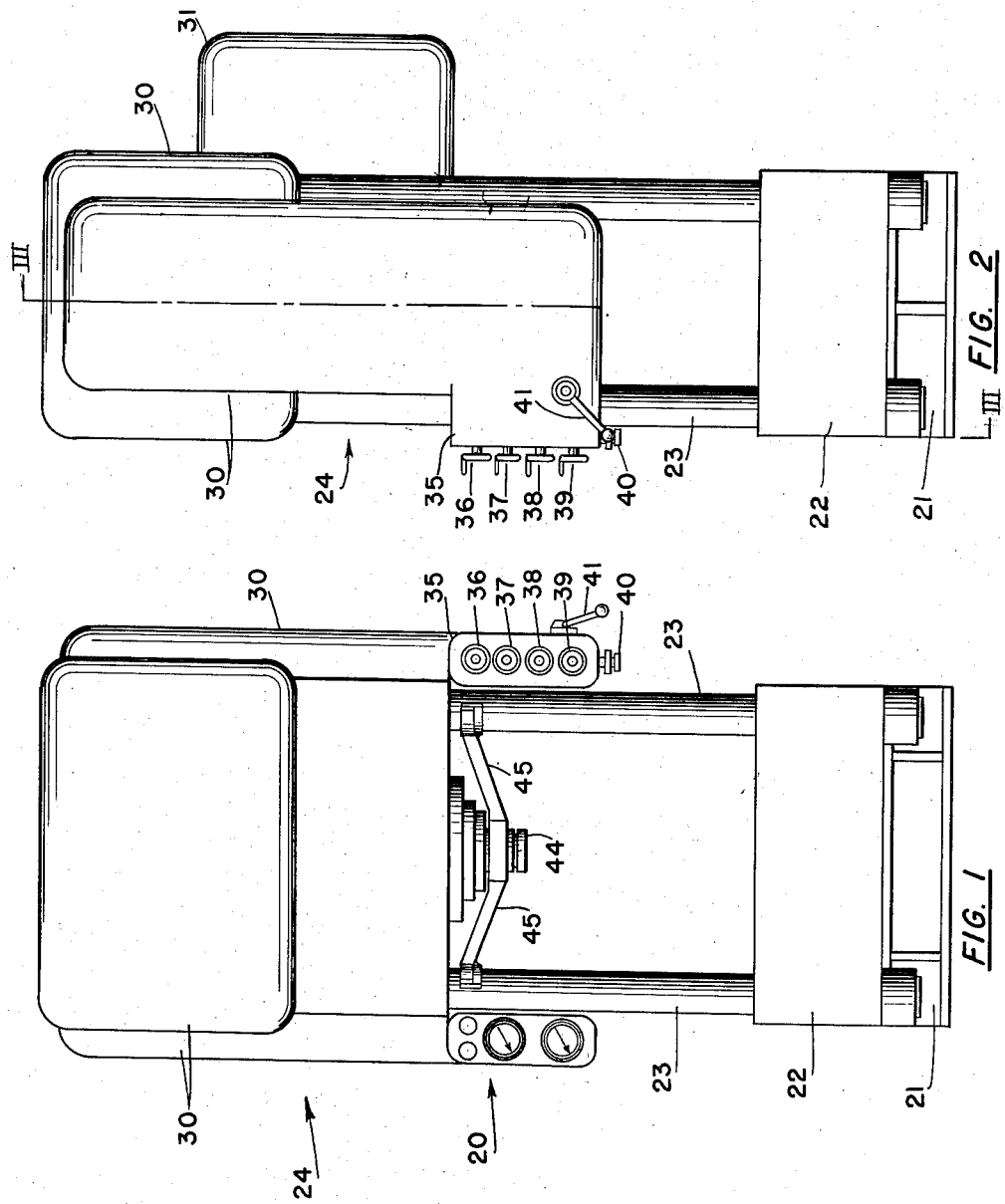
INVENTORS
CECIL E. ADAMS
ELLIS H. BORN
BY
Herschel C. Omohundro
attorney.

Sept. 25, 1951  C. E. ADAMS ET AL  2,569,214
HYDRAULIC APPARATUS
Filed May 8, 1948  22 Sheets-Sheet 2

INVENTORS
CECIL E. ADAMS
ELLIS H. BORN
BY
Herschel C. Omohundro
Attorney

Sept. 25, 1951 C. E. ADAMS ET AL 2,569,214
HYDRAULIC APPARATUS
Filed May 8, 1948 22 Sheets-Sheet 3

INVENTORS
CECIL E. ADAMS
ELLIS H. BORN
BY
Herschel C. Omohundro
Attorney

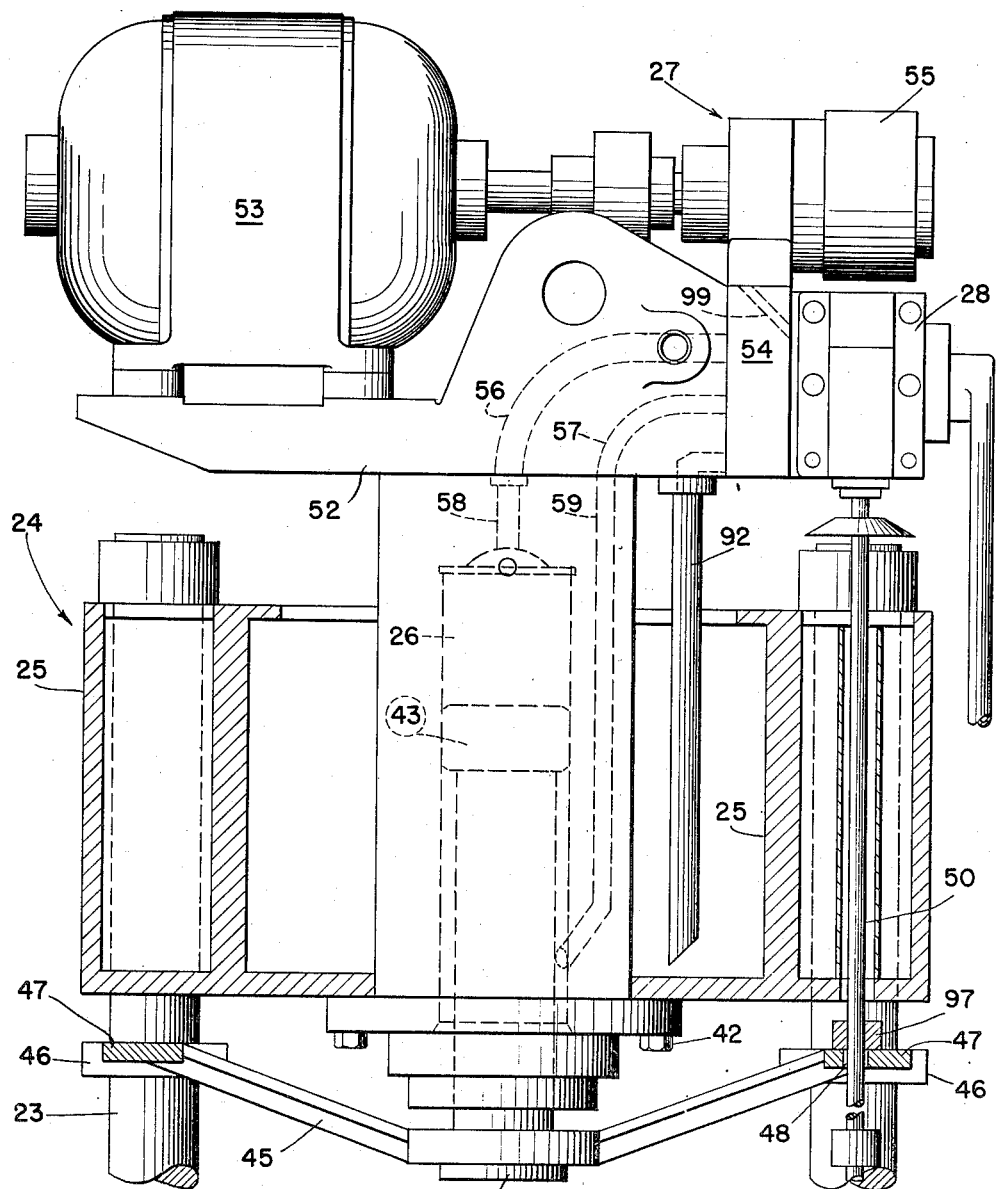

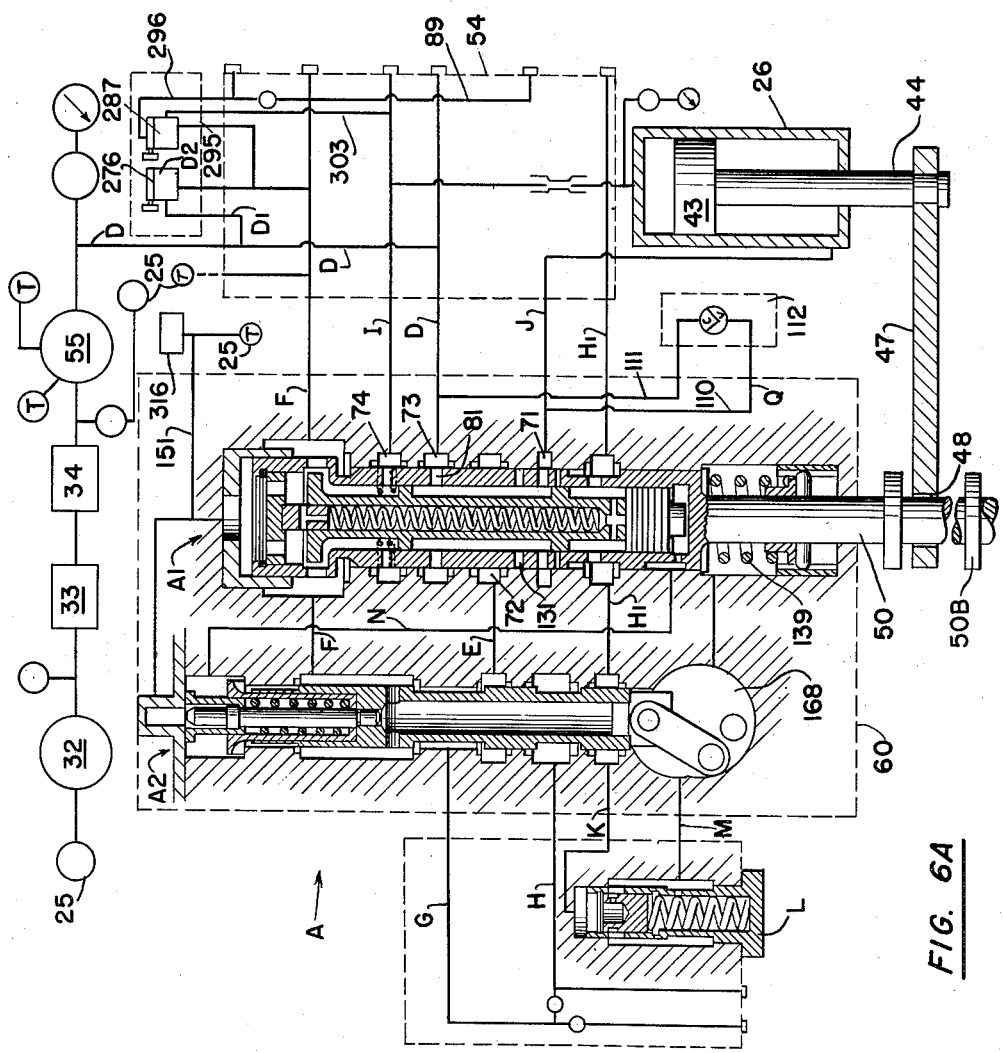

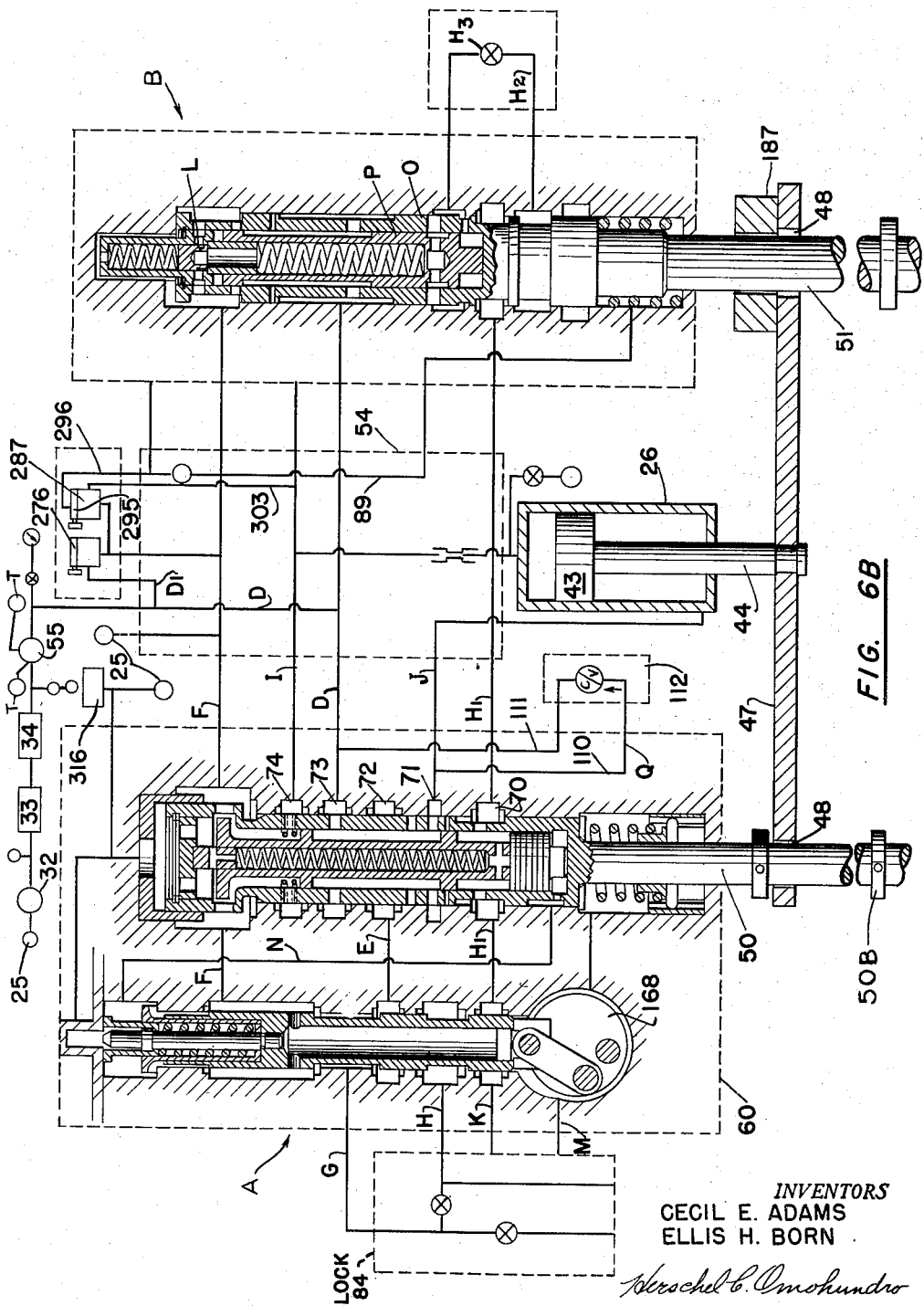

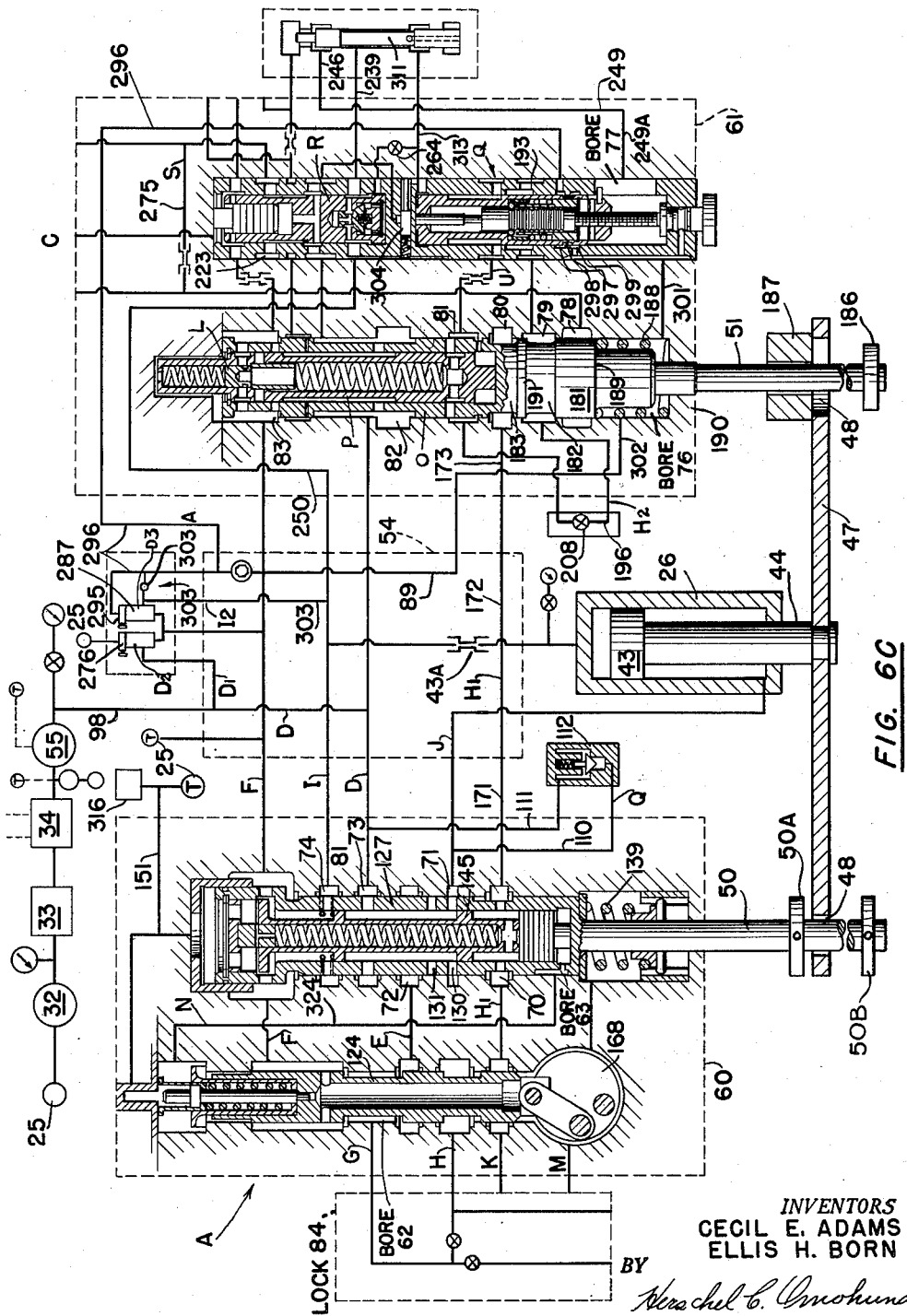

INVENTORS
CECIL E. ADAMS
ELLIS H. BORN

Sept. 25, 1951

C. E. ADAMS ET AL 2,569,214

HYDRAULIC APPARATUS

Filed May 8, 1948

INVENTORS
CECIL E. ADAMS
ELLIS H. BORN
BY
Herschel C. Omohundro
Attorney

INVENTORS
CECIL E. ADAMS
ELLIS H. BORN
BY Herschel C. Omohundro
attorney

Sept. 25, 1951

C. E. ADAMS ET AL 2,569,214

HYDRAULIC APPARATUS

Filed May 8, 1948

INVENTORS
CECIL E. ADAMS
ELLIS H. BORN
BY
Herschel C. Omohundro
Attorney

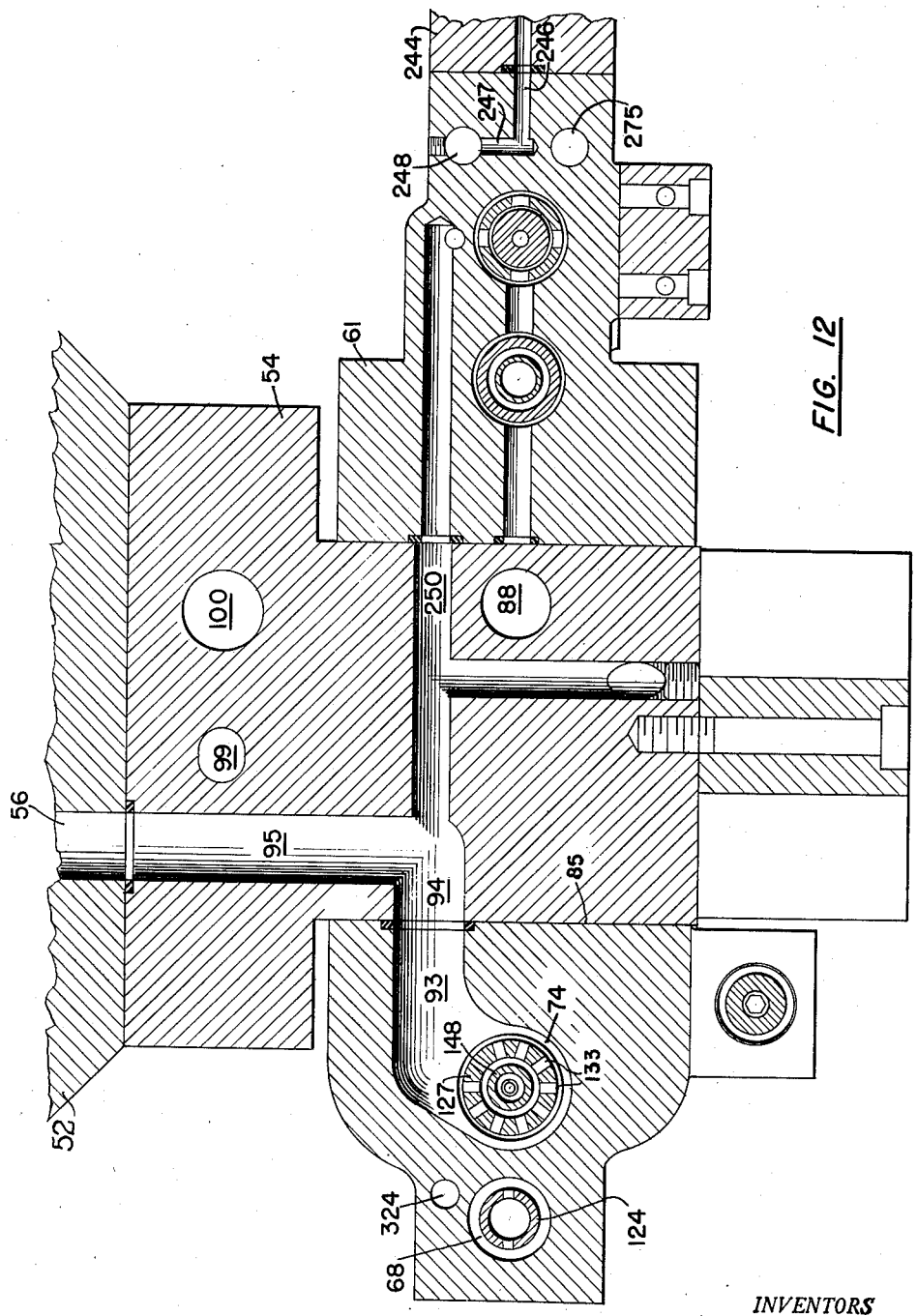

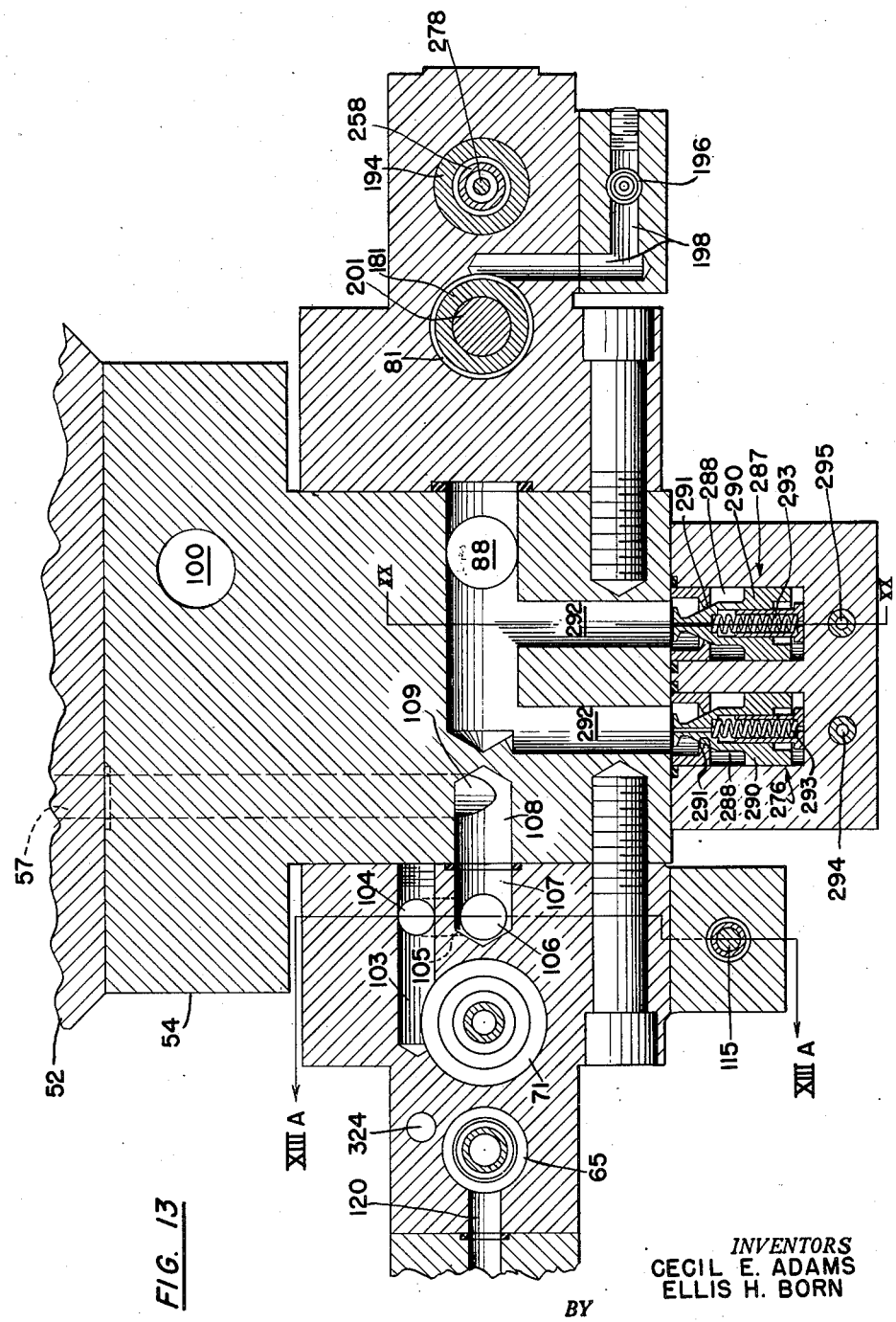

Sept. 25, 1951

C. E. ADAMS ET AL 2,569,214

HYDRAULIC APPARATUS

Filed May 8, 1948

INVENTORS
CECIL E. ADAMS
ELLIS H. BORN
BY

*Herschel C. Omohundro*
attorney

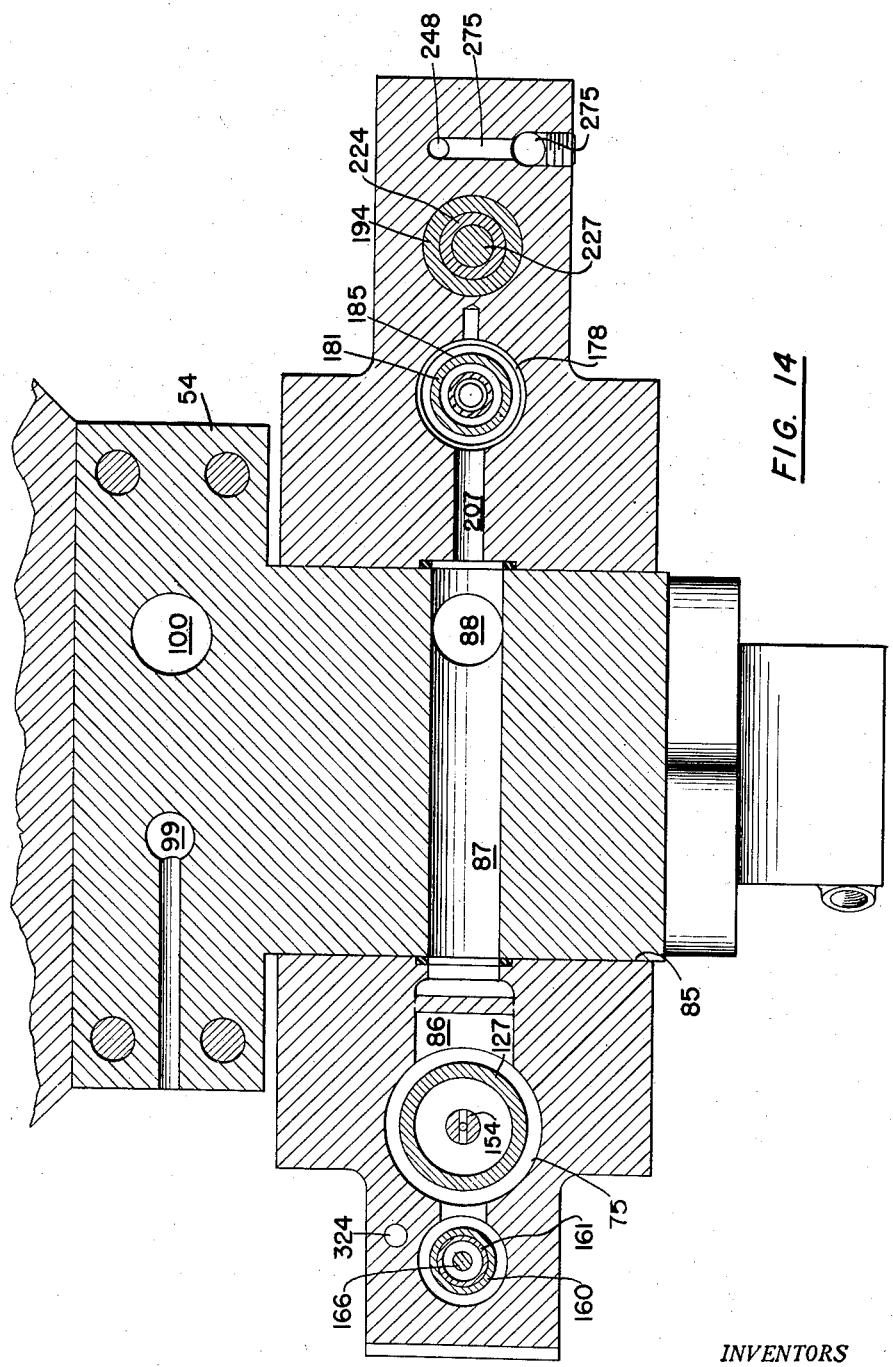

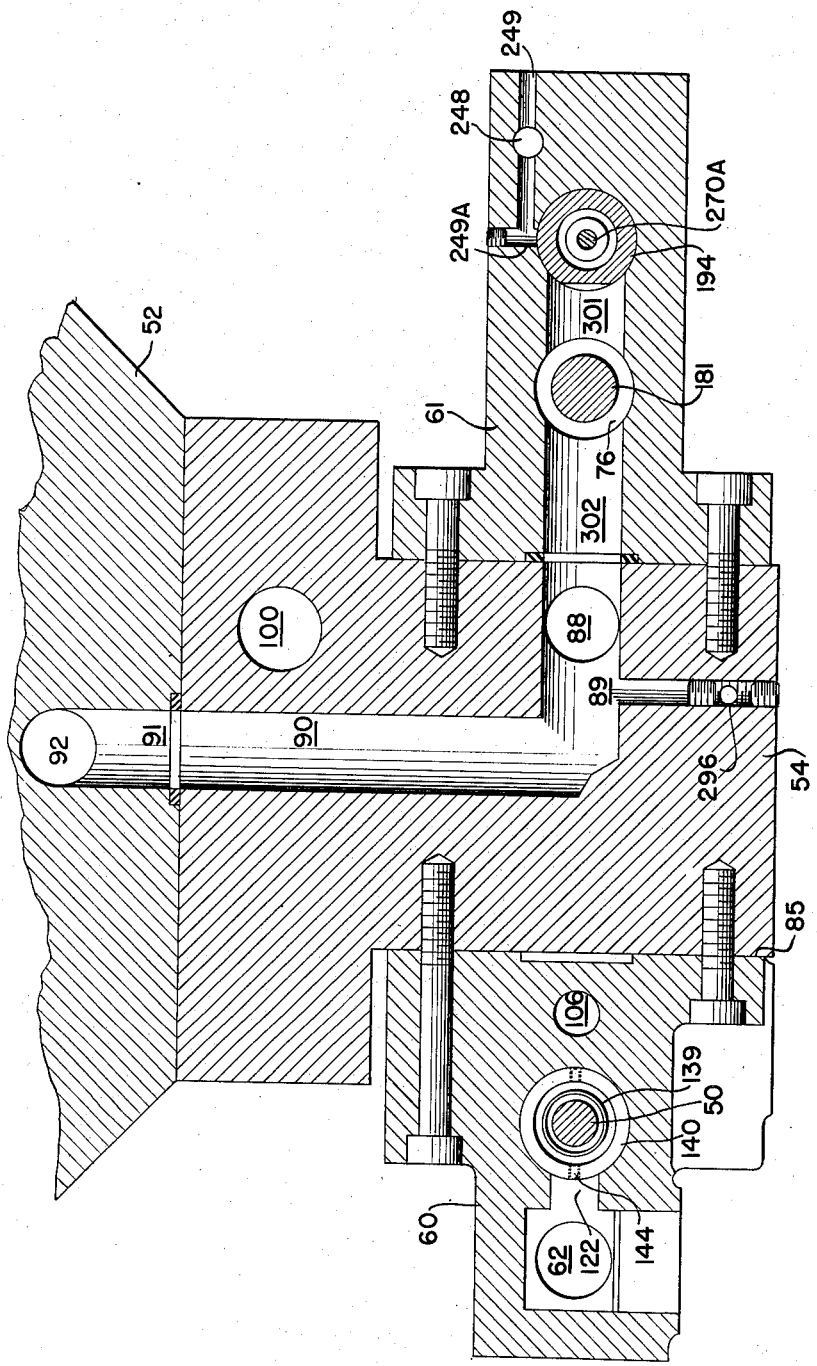

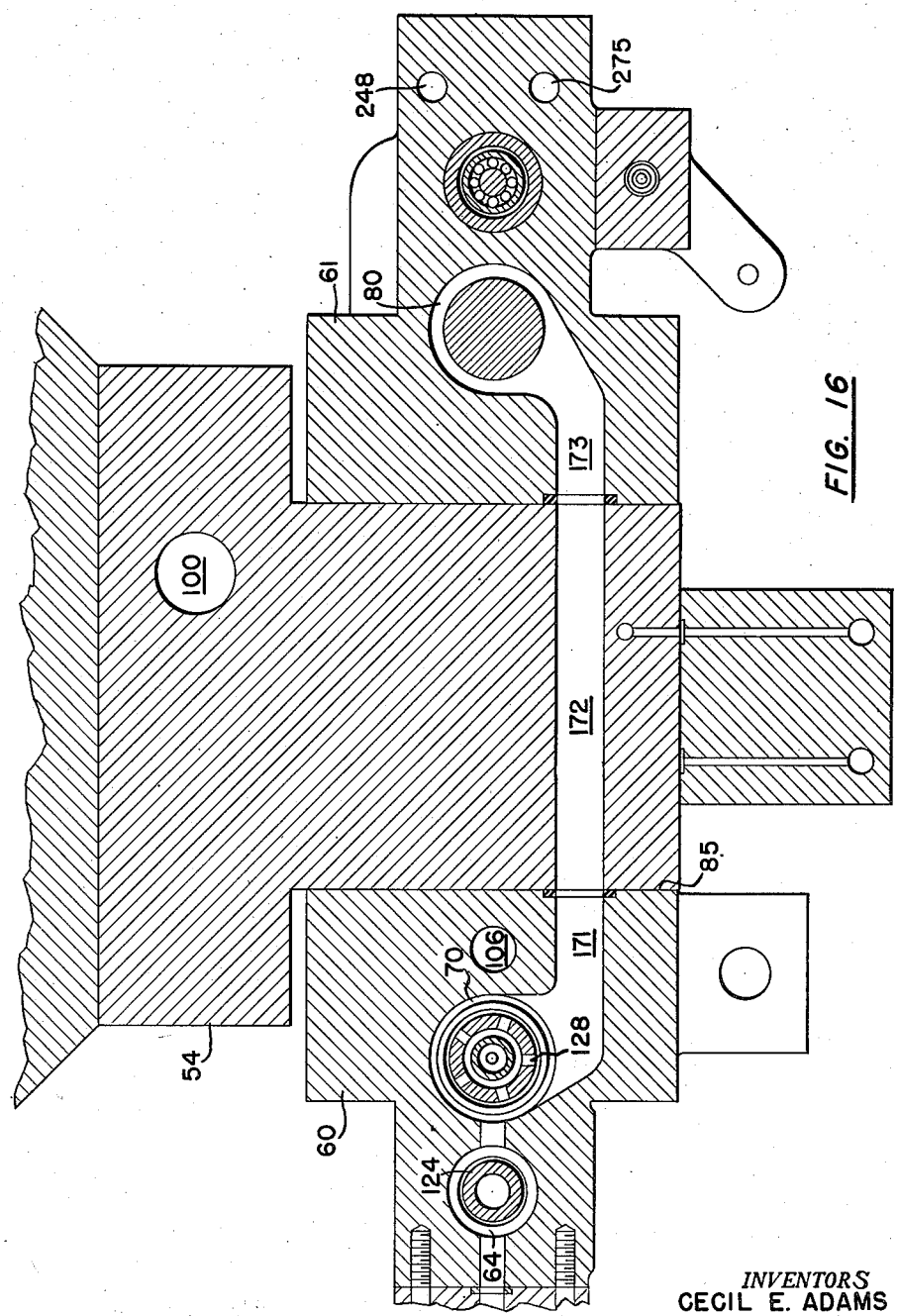

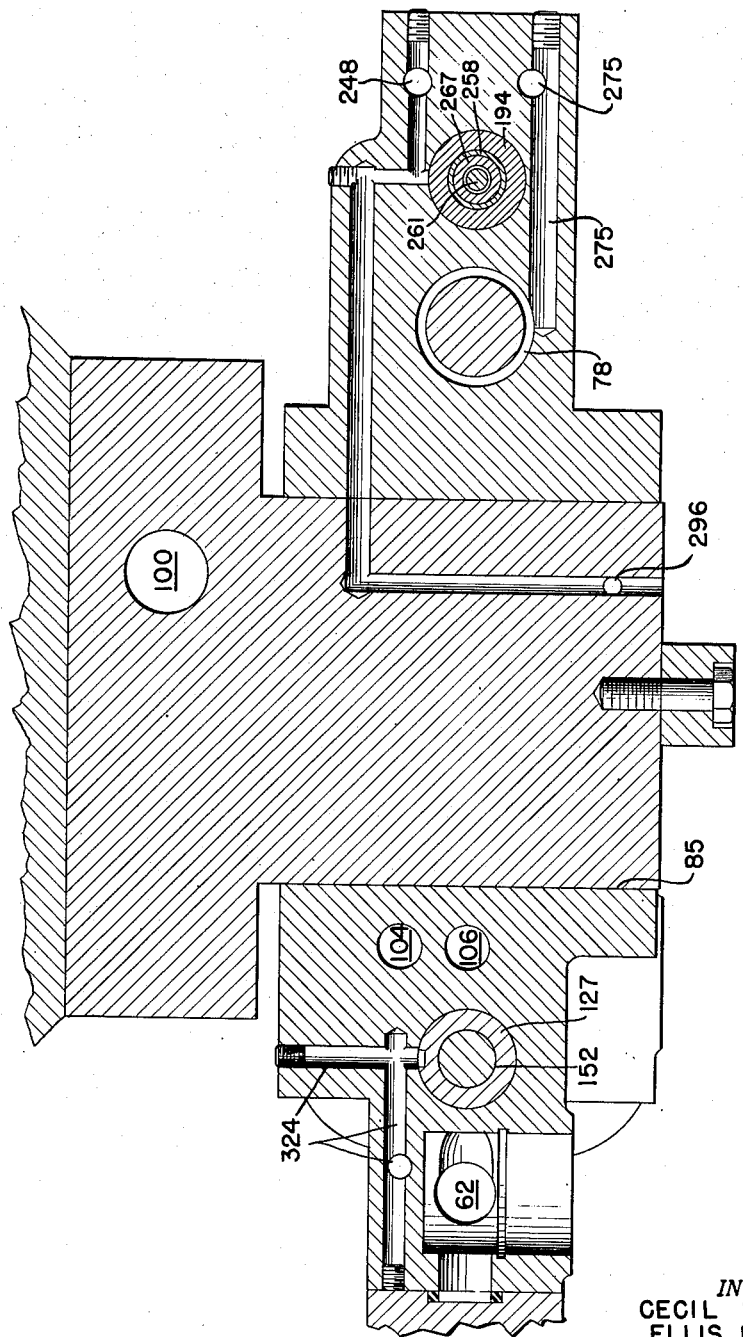

Sept. 25, 1951  C. E. ADAMS ET AL  2,569,214
HYDRAULIC APPARATUS
Filed May 8, 1948  22 Sheets-Sheet 21

INVENTORS
CECIL E. ADAMS
ELLIS H. BORN
BY
Herschel C. Omohundro
attorney

Sept. 25, 1951

C. E. ADAMS ET AL 2,569,214

HYDRAULIC APPARATUS

Filed May 8, 1948

INVENTORS
CECIL E. ADAMS
ELLIS H. BORN
BY

Patented Sept. 25, 1951

2,569,214

UNITED STATES PATENT OFFICE 2,569,214

HYDRAULIC APPARATUS

Cecil E. Adams and Ellis H. Born, Columbus, Ohio, assignors to The Denison Engineering Company, Columbus, Ohio, a corporation of Ohio Application May 8, 1948, Serial No. 25,948

35 Claims. (Cl. 60—52)

This invention relates to hydraulic apparatus and, in its specific aspects, is directed to hydraulic presses and valve mechanism for automatically controlling such presses to secure desired operations thereof.

An object of the invention is to provide a hydraulic press having an automatically operated valve mechanism for controlling the action of the press ram to secure a plurality of different operations thereof, such as, plain reciprocatory motion one cycle at a time, plain reciprocatory motion with cycles repeated automatically for a desired time period, a cycle of movement in which the ram is extended then reciprocated a desired number of times through a portion of its normal stroke and then returned to its starting position, such cycle being automatically repeated as many times as desired; a cycle similar to the previous cycle but modified by having the ram approach the work rapidly until reaching a certain point then move at a reduced rate until the first pressing impulse is completed after which subsequent pressing impulses or reciprocations will be executed at a speed between the fast approach and the speed of the first pressing stroke, or a similar cycle in which the first pressing impulse is executed at a low tonnage, the subsequent pressing impulses being executed at a higher tonnage, other modified operations also being possible.

Another object of the invention is to provide a press having an automatically operated valve mechanism which may be manually controlled to secure certain desired operations such as "inching" or moving the ram in a pressing stroke gradually or a step at a time, to stop or retract at will so that the press may be set up for a particular job without danger of damaging expensive forming dies or other tools used on the press, another operation being the immediate return of the ram to starting position from any stage of movement thereof to the end that the press will be rendered safe for use at all times.

Still another desired operation of the ram is a "hold down" operation or one in which the ram descends and exerts a continuous force on an article of work disposed in registration with the ram on a support or table.

A further object of the invention is to provide a press having a single, automatically operating control valve mechanism with which all the foregoing operations may be secured in the ordinary or usual operation of the press without requiring any modification of the structure of the valve mechanism.

Another object is to provide a hydraulic press having a hydraulic system with a plurality of relief valves and valve mechanism for automatically controlling the operation of the press ram, the controlling valve mechanism having a reverse valve which is maintained in position to cause an advance of the ram by fluid pressure generated by resisting the exhaust flow of fluid from the ram operating cylinder during the advance of the ram, the reverse valve moving to another position to cause retraction of the ram when the advance motion thereof is interrupted, one of the relief valves being set to spill pump fluid to exhaust at relatively low pressure when the ram meets an obstruction capable of exerting a predetermined resistance, the control valve mechanism being provided with fluid pressure operated means, in the form of a spool, for causing the reverse valve to again move to the position wherein ram-advancing motion is caused after a predetermined fractional part of the retractive stroke has been executed, additional fluid-operated means being provided in the control valve mechanism for cutting out the relief valve set at low pressure in order that the ram will execute subsequent pressing impulses with a higher force than was exerted during the first impulse, the change in force being made automatically without attention of the operator. The press is thus made particularly suitable for pressing articles from powdered or similarly comminuted material since in such operations it is desirable to have a light initial pressing force to permit the escape of air and subsequent high-pressing force in the final forming operations.

It is still another object of the invention to construct the control valve mechanism in a plurality of sections which may be combined, by simply fastening the same together, to produce a mechanism capable of causing all the ram operations set forth, or separated and one or more parts omitted if certain of the operations are not desired.

This invention is similar to that disclosed in the co-pending application of Cecil E. Adams Serial No. 594,963, filed May 21, 1945, now Patent No. 2,512,730, issue June 27, 1950, but is improved in many respects to perform the operations secured therewith in a better, more positive, more accurate manner and to provide additional features of operation.

An object of the invention is to provide a hydraulic press having a control valve mechanism which will cause the reciprocation of the press ram automatically, the valve mechanism being constructed to permit the fluid being exhausted from one side of the ram operating piston to be introduced into the power cylinder at the other side of the piston whereby rapid movement of the ram throughout any desired portion of the stroke will be secured, the valve mechanism also being formed to so control the fluid admitted to the power cylinder that the ram may be caused to move at a controlled slow pressing speed during any desired portion of its stroke.

Another object is to provide a control valve mechanism for a ram which will cause an initial ram motion as set forth in the preceding paragraph then a plurality of short alternate pressing and return reciprocatory strokes at full operating speed, these operations being secured automatically.

A further object of the invention is to provide a control mechanism for a hydraulic press which mechanism is so formed that it will be semi-automatic in operation to permit the operation of the pressing ram and one or more accessories in sequence, the operation of one device being dependent upon the operation of the other, whereby an interrelation will be secured which will prevent interference between the various devices.

A still further object of the invention is to provide a valve mechanism which may be converted from a fully automatically operated device to a semi-automatic one of the type set forth in the preceding paragraph by the mere expedient of removing, shifting, and replacing certain valve plugs, thus simplifying the conversion of an automatic press without accessory to one with accessories and securing the sequential operation of the press and the accessories without structural change or alteration of the valve mechanism.

It is also an object of the invention to provide a valve mechanism for governing the operation of a hydraulic press and one or more hydraulically operated accessories therefor to secure their operation in sequence, the valve mechanism being provided with a manually actuated control so formed as to permit the selective, slow operation or "inching" of either the press ram or a movable part of the accessory, thus facilitating the setting up of the device for a particular job.

Further objects and advantages of the present invention will be apparent from the following description, reference being had to the accompanying drawings wherein a preferred form of embodiment of the invention is clearly shown.

In the drawings:

Figure 1 is a front elevational view of a hydraulic press embodying the present invention.

Figure 2 is a side elevational view of the press shown in Fig. 1.

Figure 5 is a detail vertical transverse sectional view taken through the head of the press with parts shown in elevation, the plane of the section being indicated by the line V—V of Figure 4.

Figures 6A, 6B and 6C are diagrammatic views of optional hydraulic circuits used in the press shown in Fig. 1.

Figure 12 is a detail horizontal sectional view taken through the valve on the plane indicated by the line XII—XII of Fig. 7.

Figure 13 is a similar view on the plane indicated by the line XIII—XIII of Fig. 7.

Figure 14 is a detail horizontal sectional view taken on the plane indicated by the line XIV—XIV of Fig. 7.

Figure 15 is a similar view taken through the valve on the plane indicated by the line XV—XV of Fig. 7.

Figure 16 is also a similar view taken through the valve on the plane indicated by the line XVI—XVI of Fig. 7.

Figure 17 is a similar view taken through the valve on the plane indicated by the line XVII—XVII of Fig. 7.

Figure 21 is a detail vertical sectional view taken through a portion of the stroke counting mechanism on the plane indicated by the line XXI—XXI of Fig. 10.

Figure 3:
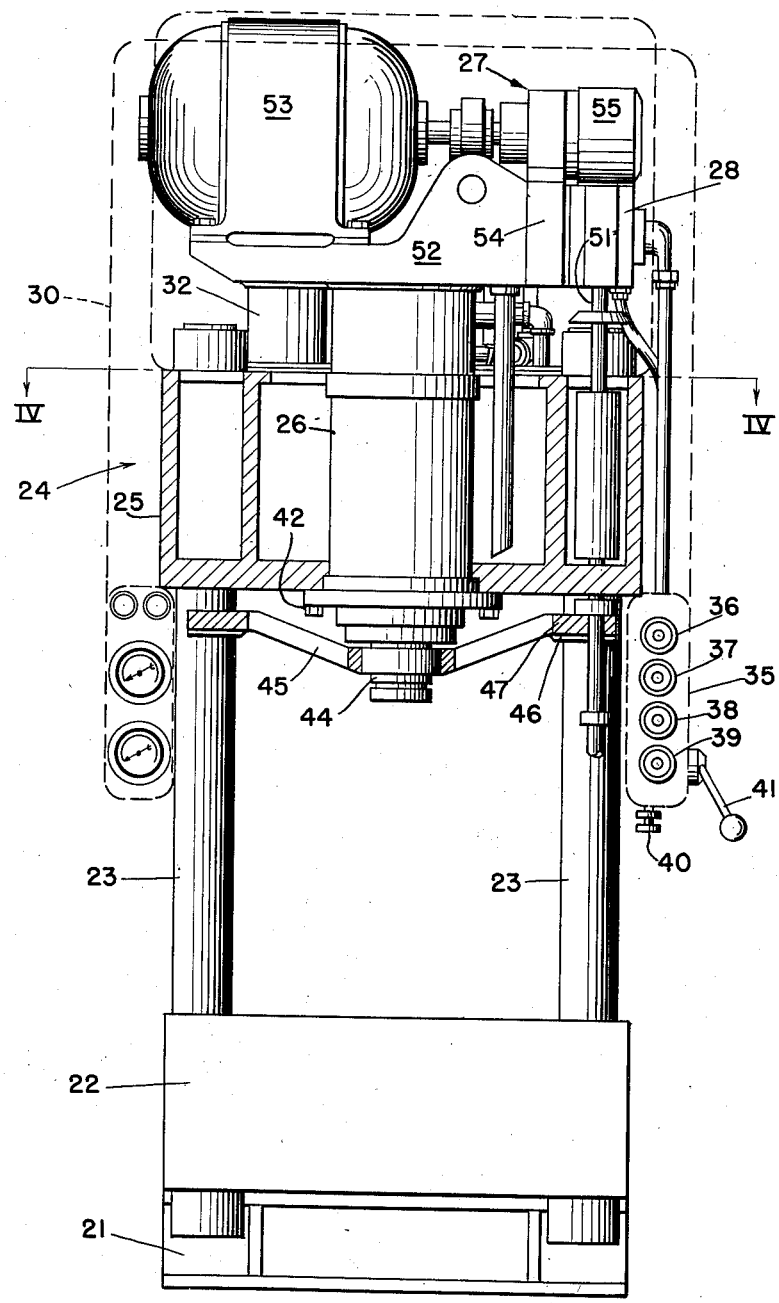
Figure 3 is a vertical sectional view with parts in elevation taken through the press on the plane indicated by the line III—III of Fig. 2, certain parts of the housing of the press being indicated by dotted lines.

Referring more particularly to the drawings: The press is indicated by the numeral 20. This press is intended to be of fairly heavy capacity but the principles of the invention are applicable to both heavy and light capacity presses and, although reference may frequently be made to one or the other, it is intended to embrace all presses in this application. The press 20 includes a foot section 21; a bolster or table section 22, which is applied to the upper surface of the foot section and suitably secured thereto; upwardly projecting strain rods 23 disposed at the corners of the table section 22 and a head section, indicated generally by the numeral 24, supported by the strain rods. This head section 24 includes a hollow body 25 constituting a fluid reservoir, a power cylinder 26 extending through the body 25, a pumping unit 27 supported by the upper end of the power cylinder; and control valve mechanism indicated generally by the numeral 28, which is connected to the pumping unit; all this mechanism being inclosed by suitably formed housing sections 30.

Figure 4:
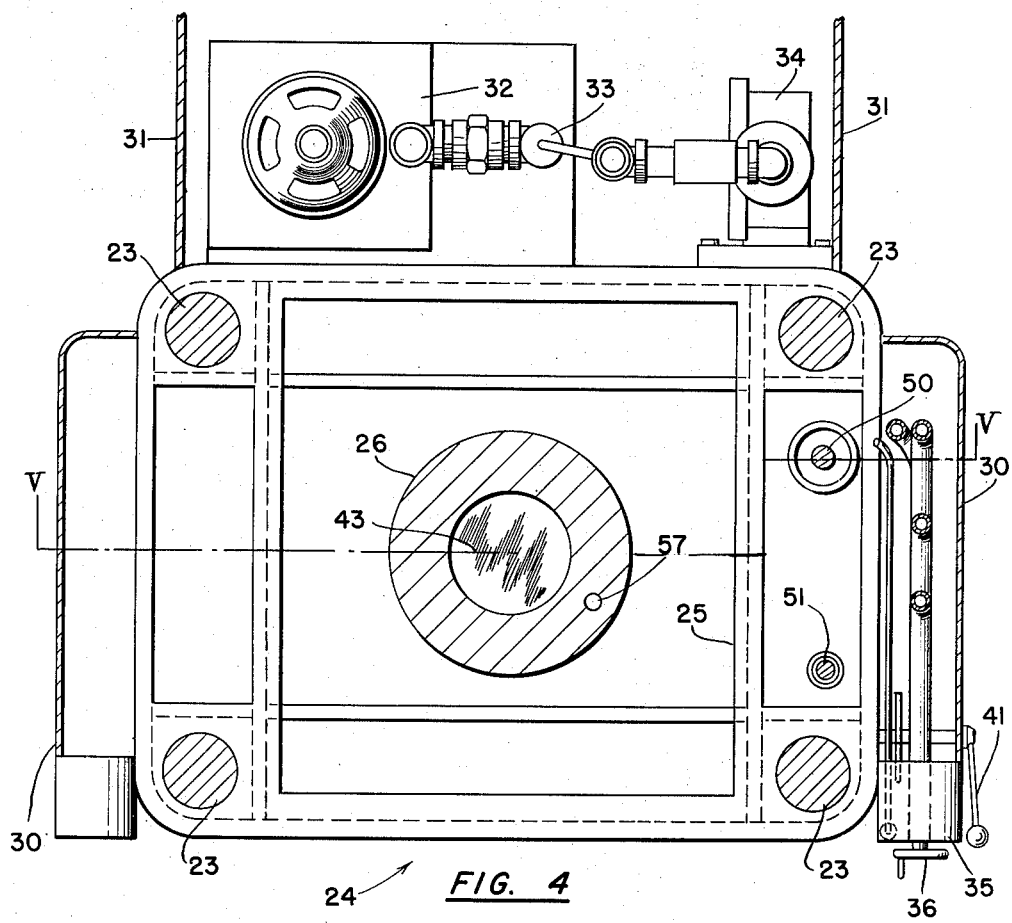
Figure 4 is a detail horizontal sectional view taken on the plane indicated by the line IV—IV of Figure 3.

As indicated in Figs. 2 and 4, the rear portion of the head section is provided with a supplemental housing 31 in which is disposed a motor-driven booster pump 32, and filter and cooler units 33 and 34, respectively.

Since the press indicated in the drawings is of heavy capacity and consequently of large size, the valve control mechanism is disposed beyond the reach of the operator and a control panel 35 is, therefore, provided, this panel being located adjacent the head section 24 at the right side of the press and provided with operating elements 36 to 41 inclusive.

The power cylinder 26 extends through an opening in the bottom wall of the reservoir 25 and is bolted thereto in fluid-tight engagement by suitable fastening means 42. This cylinder has a piston 43 disposed for sliding movement therein, a ram 44 depending from the piston and projecting through the bottom wall of the cylinder. The lower end of the ram 44 is provided with diverging laterally projecting arms 45, which have their outer ends 46 formed with semi-circular recesses for engagement with a pair of strain rods, the latter serving to prevent rotation of the arms and the ram 44. A bar 47 is integrally formed with, and extends between, the ends 46, the bar being formed with openings 48 for reception of shipper rods 50 and 51 used to operate parts of the control valve mechanism 28 during the reciprocation of the press ram and the piston in the power cylinder.

As shown in Fig. 3, the pumping unit 27 comprises a base 52 having one end formed for the support of an electric motor 53 and the opposite end formed for the attachment of a subplate 54 constituting the mounting for the control valve mechanism. This subplate 54 also serves as a means for connecting the main fluid pump 55 to the base 52. The pump 55 may be of any suitable type and of a capacity sufficient to supply fluid in the volume necessary to effect the operation of the ram. This pump 55 is assisted by the booster pump 32 which forces oil through the filter 33 and cooler 34 when the press is in operation, this oil being supplied to the inlet of the main pump 55.

One of the features of the present invention is to provide a relatively heavy capacity press which is substantially devoid of piping or tubing. In order to accomplish this object, the base 52 and the subplate 54 have been provided, these members being formed by a molding or similar process and having passages cored, machined, or otherwise formed therein. As illustrated in Fig. 5, two of these passages 56 and 57 are formed in the base and these communicate at one end with passages 58 and 59 formed in the power cylinder, the latter passages leading to the opposite ends of a piston chamber formed in such cylinder.

Another of the features of the invention is the construction of the control valve mechanism from a plurality of pieces which may be assembled in different combinations to cause desired types of ram operation, certain of the pieces being removable and replaceable by others when some of the types of operation are not desired. One combination of valve pieces provides a total of all the operations suggested above. This combination has been illustrated in detail in Figs. 7 to 17, inclusive, in the drawings, and diagrammatically illustrated in Fig. 6C.

The control valve mechanism 28 is composed of a plurality of sections which function to cause certain operations of the ram. For example, one section designated generally by the letter A in Figs. 6A, 6B and 6C, is operable, substantially without assistance from the other section or sections, to cause the ram to reciprocate through normal length strokes either one stroke at a time or automatically repeated strokes for an indefinite period of time. With this section it is also possible to cause the ram to return immediately to starting position, in the event of an emergency or otherwise, and to advance in a pressing stroke under manual control either slowly or a step at a time or to stop at any desired point in its advance.

Another section of the valve, designated generally by the letter B in Fig. 6B, functions when combined with section A to cause other operations of the press ram. The combination A and B is operable to cause the press ram to advance in the pressing stroke at one or two different rates, the first rate being a relatively high speed and the second rate being a slower or adjustable controlled speed. This controlled speed is secured by automatically by-passing a portion of the fluid supply to the reservoir rather than directing it to the power cylinder. When the combination A and B is used, the operations set forth above and secured by the section A may also be secured.

A third section designated by the letter C in Fig. 6C, may be substituted for the section B when other ram operations are desired. Section C is similar to section B and causes the same ram operations but is modified by the inclusion of other mechanism which causes the press ram to execute additional operations. As mentioned in the objects, it is sometimes desired to cause the press ram to perform a series of short pressing strokes at the conclusion of a normal pressing stroke. The additional mechanism in section C is operable to cause these short pressing strokes. It is also operable to regulate the number and length of the short strokes and with additional mechanism, to change the character of certain strokes of the ram such as to cause the desired strokes to be executed with a different force than other stokes or to be executed at a different speed than the other strokes.

The general operations of the various valve sections and combinations thereof can readily be understood from the following description and reference to Figs. 6A, 6B and 6C.

In Fig. 6A a circuit employing only valve section A is shown diagrammatically. This circuit includes the reservoir 25, booster pump 32, filter and cooler units 33 and 34, respectively, and the main pump 55, this member supplying fluid under pressure through a line D to the circuit. The valve section A has a ram-controlling valve mechanism A1 with which the direction of the ram movement is controlled and a manual control valve mechanism A2 for initiating and stopping ram operation. These mechanisms will be described in detail later. Fluid supplied through line D when the press is inactive flows through the valve mechanism A1 to line E and then around a spool in the manual control valve mechanism A2 to line F which leads to reservoir 25. By actuating the manual control valve mechanism to interrupt communication between lines E and F the fluid will be caused to flow from line E through line G to lines H and HI. These lines lead to the ram controlling valve at the lower end of a reversing shuttle valve therein causing this member to move up to a position to connect line D with a line I leading to the upper end of the power cylinder 26. Fluid admitted to the top of cylinder 26 causes the piston 43 to start to descend, which permits a sleeve valve forming part of the ram-controlling valve mechanism to lower and interrupt communication between lines D and E. This source of fluid pressure to hold the shuttle valve elevated is thus interrupted, however, the descent of piston 43 forces fluid from the lower end of the power cylinder through line J back to the ram-controlling valve mechanism. With the shuttle valve of this mechanism elevated, line J (see Fig. 6A) is connected by line HI with line K which contains a flow-restricting device indicated generally by the letter L. A line M leads from the device L to the end of the manual control valve mechanism which in turn serves as a conductor to connect line M with the line F leading to the reservoir 25. The flow of fluid being exhausted from the power cylinder is resisted by the device L causing a back pressure to be generated, which back pressure is applied to the bottom of the shuttle valve to hold the same in the elevated position and continue forward or downward ram movement. When the ram and piston stop moving due to the engagement of the ram with an obstruction offering sufficient resistance to cause the pressure in line D to increase enough to make the fluid flow through shunt line DI containing relief valve D2, the exhaust flow will stop, the fluid back pressure will be dissipated and the shuttle valve will be lowered to a position wherein supply line D will be connected with line J and line I leading from the top of the power cylinder will be connected with line F leading to the reservoir 25. The fluid pressure beneath the piston 43 will cause upward movement thereof. As the piston approaches the upper end of its stroke, the sleeve valve portion of the ram-control valve mechanism will be moved up until line D no longer communicates with line J but instead is again connected with line E. If the manual control valve has been returned to the position to establish communication between lines E and F, the ram will remain in the elevated position. If the manual control valve has been retained in its lowered position to which it was originally moved, another ram cycle will be initiated by fluid flowing to the space at the lower end of the shuttle valve. These ram cycles will be repeated as long as the manual control valve remains in the lowered position.

In the event the operator should wish to interrupt the ram during any pressing stroke he may actuate the manual valve, by moving it upward, to establish direct communication between the space at the lower end of the shuttle valve and the space at the lower end of the manual control valve which latter space is connected via the interior of the manual valve and line F with the reservoir 25. The back pressure will be quickly dissipated and the shuttle valve will move to a lowered position wherein the supply line D will be connected with the lower end of the power cylinder. Piston 43 and the ram will return toward their elevated positions.

As mentioned in the objects means have been provided for "inching" the ram downward, that is, causing the ram to advance slowly or step by step under manual control. This means is formed with the upper end of the manual control spool which closely fits the bore provided therefor. The upper end of this bore is connected by a line N with a chamber beneath a piston located at the lower end of the shuttle valve. By moving the manual control valve spool upward through the position which causes reverse ram movement and continuing the upward movement fluid may be forced from the spool chamber through line N to the under side of the piston below the shuttle valve. This fluid will move the piston and shuttle valve upward under the operator's control until the desired degree of communication is established between supply line D and the top cylinder line I. This communication may be increased or decreased at will by the operator merely by moving the manual spool up or down thus governing the advance of the ram. When the operator releases the control element for the manual spool, this spool will return to normal position causing the ram to do likewise. It is sometimes desired to cause the ram to move through a stroke of predetermined length and then retract without the ram engaging an obstruction offering sufficient resistance to cause the relief valve D2 to permit the flow of fluid to exhaust. To accomplish this purpose the shipper rod 50 is provided with a lower collar 50B which the bar 47 may engage when the ram is extended far enough. When this engagement occurs, the sleeve in mechanism AI is moved downwardly until a groove adjacent the upper end establishes communication between the top cylinder line I and the tank line F. At this time there will be insufficient pressure to move the ram and it will therefore stop. The exhaust flow will then stop permitting the back pressure to dissipate and the shuttle valve spool to move downward to a position to establish communication between the pressure line D and the bottom cylinder line J. The ram will then be retracted.

When the section B is combined with section A a separable piece of the valve casing containing the flow-restricting device L is removed and another block 84 from which the device L has been omitted, substituted therefor. The block 84 closes the end of conduit K and causes exhaust fluid to flow through line HI and to the tank 25 over another path in section B. Section B contains mechanism with which the ram may be caused to execute working strokes with a rapid traverse or approach portion and a controlled slower speed pressing portion. This mechanism includes a ram controlled sleeve valve member O and a pressure responsive spool valve member P plus a flow-restricting device L which is similar in construction and operation to the one mentioned previously. The combination of section B and section A provides a new outlet for fluid exhausted from the lower end of the power cylinder, line HI then being connected to the chamber for sleeve valve O. When the ram is fully retracted, the sleeve valve O blocks line HI so that fluid being exhausted will be forced to flow through a line Q connecting the bottom cylinder line J and the power supply line D. Line Q contains a check valve which is biased toward a closed position. As long as fluid flows through line Q the ram will move rapidly because the full volume of the fluid pressure source is effective over an area of the piston 43 equal to the area of the ram. After the ram advances a predetermined distance it will actuate sleeve valve O to connect line HI with an exhaust line continuation H2 leading to the portion of the valve O containing the spool valve P, these members being hollow and forming a conductor connecting the line H2, through the restricting device L with the tank line F. Thus when the ram actuates sleeve valve O to connect lines HI and H2 fluid may be exhausted from the power cylinder to reservoir 25 and the line Q will be ineffective. Since at this time the power supply is applied to the entire area of piston 43 the rate of movement of the piston and ram will be decreased. If desired, this rate of movement may be further decreased by reducing the size of an adjustable orifice H3 disposed in line H2 and applying the pressures at the sides of this orifice to the opposite ends of the spool valve P. The higher pressure at one end of the spool causes the spool to move to a position establishing communication between pressure supply line D and tank line F. The degree of communication depends upon the restriction caused by the orifice. The rate of ram movement after sleeve valve is actuated during the advance of the ram will depend upon the setting of the adjustable orifice in line H2. In the combination of valve sections A and B, the restriction L functions in the same manner as before to create back pressure to hold shuttle valve in section A elevated.

Fig. 6C shows, diagrammatically, the hydraulic circuit produced by removing valve section B and substituting section C. With the combination of A and C, all of the features of ram operation mentioned in the objects may be secured. Section C includes sleeve and spool valves and a flow restricting device identical with elements O, P and L, respectively, in section B, which elements function in the same manner as before. Also included in section C are means for causing the press ram to execute one or a series of short pressing impulses after the initial pressing stroke, means for regulating the number of short strokes in the series and for terminating the series after the desired number of short strokes or pressing impulses have been executed. Means are also provided in section C for setting the stroke number regulating mechanism for succeeding cycles of ram operation. Section C is further provided with means for interrupting the operation of the speed regulating means at a desired point in the ram cycle and means for automatically changing the force exerted by the ram during certain strokes in a cycle of operation.

The means for causing short strokes to be executed by the ram comprises a piston type valve R which is responsive to fluid pressure differentials to alternately establish and interrupt communication between the fluid pressure supply line D and a line S which communicates with line HI when sleeve valve O occupies its lowermost position. During the execution of a pressing stroke by the ram, the valve R is held in a position to interrupt communication between lines D and S by fluid pressure existing in the top cylinder line I. When the pressing stroke is terminated, the top cylinder line will be connected with the reservoir as previously described and the pressure in the top cylinder line will be diminished, the bottom cylinder line J will then be connected with the pressure source and the ram will start to retract, also as previously described. When the pressure is diminished in the top cylinder line, valve R will be shifted by supply line pressure to a position to permit communication between lines D and S. Fluid will then flow through line S, past sleeve valve O and through line HI to the interior of the sleeve in the ram control valve mechanism at the lower end of the shuttle valve spool. This fluid will cause the shuttle valve to move up to its elevated position and again connect the top cylinder line I with the pressure supply line D causing the ram to execute another pressing stroke. When this stroke starts, the top cylinder line pressure increases causing piston valve R to again shift to a position to interrupt communication between lines D and S. When this pressing stroke is completed the ram starts to retract and the above operations are repeated. This short stroke operation will continue until interrupted either manually or by some automatically operating mechanism. It may be manually interrupted by moving the manual control spool to a position to connect line HI with the lower end of the bore for such spool, thus connecting the space at the lower end of the shuttle valve in valve section A with the tank line F. This operation permits the shuttle valve to drop to its lowermost position and connect the fluid pressure supply line D with the bottom cylinder line J causing the retraction of the ram. During the retraction of the ram, the sleeve O is moved to a position to interrupt communication between lines S and HI.

To automatically interrupt the short stroke operation a short stroke counting device Q is provided in the section C. The device Q includes a plunger which moves step by step in response to the reciprocations of the piston valve R. This plunger may be set for a desired number of short strokes and after such number of strokes have been executed by the ram, the piston valve R will be prevented from moving to a position to establish communication between supply line D and line S. When valve R is held in such position the shuttle valve 145 will remain in its lowered position causing the ram to be retracted.

The counting device Q may be adjusted to prevent the execution of any short strokes or it may be set to permit the short strokes to be continued indefinitely. The plunger in device Q is moved hydraulically by fluid discharged by the piston valve R during a portion of its movement. By stopping the plunger in its movement piston valve R can be prevented from moving. After a series of short strokes have been executed and the ram is being retracted the counting device is reset for a succeeding operation by providing an outlet for the fluid in the upper end of the chamber for the plunger and introducing fluid under pressure into the lower end of the chamber to cause the plunger to return to its normal starting position.

When it is desired or required by the pressing job to apply an initial pressing force of one tonnage and subsequent successive short pressing impulses of a different tonnage a second relief valve D3 is employed. This relief valve is disposed in a shunt line I2 leading from the top cylinder line I to the tank line F. On the first stroke of a cycle of movement of the ram the pressure in the top cylinder line is controlled by the relief valve D3. When the retraction of the ram is initiated, the stroke counting spool will be depressed one step which will cause the relief valve D3 to be blocked out of pressure controlling condition. The succeeding pressing strokes of the ram will be made under pressure controlled by the first relief valve D2.

The ram may be caused to move at the same rate during all pressing strokes of a cycle or at one rate during the initial pressing stroke and at a different rate during the succeeding strokes of the same cycle. If all the pressing strokes of a cycle are to be executed at the same rate, a line U shunted around the orifice in line H2 is blocked in order to cause all of the exhaust fluid from the bottom of the cylinder to flow through line H2 and the orifice therein. The effective size of the orifice will then control the pressing speed of the ram. When the shunt line U is not blocked, the size of the orifice in line H2 will control the pressing speed of the ram on the initial pressing stroke then when the stroke counter spool moves downward one step it will operate to establish flow through the shunt line U thus rendering the orifice in line H2 ineffective. The pressing speed of the ram during the succeeding strokes will be at the normal rate, i. e., the rate wherein the full pump volume is applied to the entire area of the piston 43.

The control valve mechanism 28 selected for illustration is that indicated in Fig. 6C. It includes a plurality of casing pieces 60 and 61 which are bolted or otherwise secured to the front and rear faces of the subplate 54 to form the complete casing of the control valve mechanism. Piece 60 of the control valve mechanism 28 contains a pair of parallel vertical bores 62 and 63 see also Fig. 7, and a plurality of annular recesses spaced longitudinally of these bores, recesses 64 to 68, inclusive, surrounding bore 62 and recesses 69 to 75, inclusive, surrounding bore 63.

Figure 8:
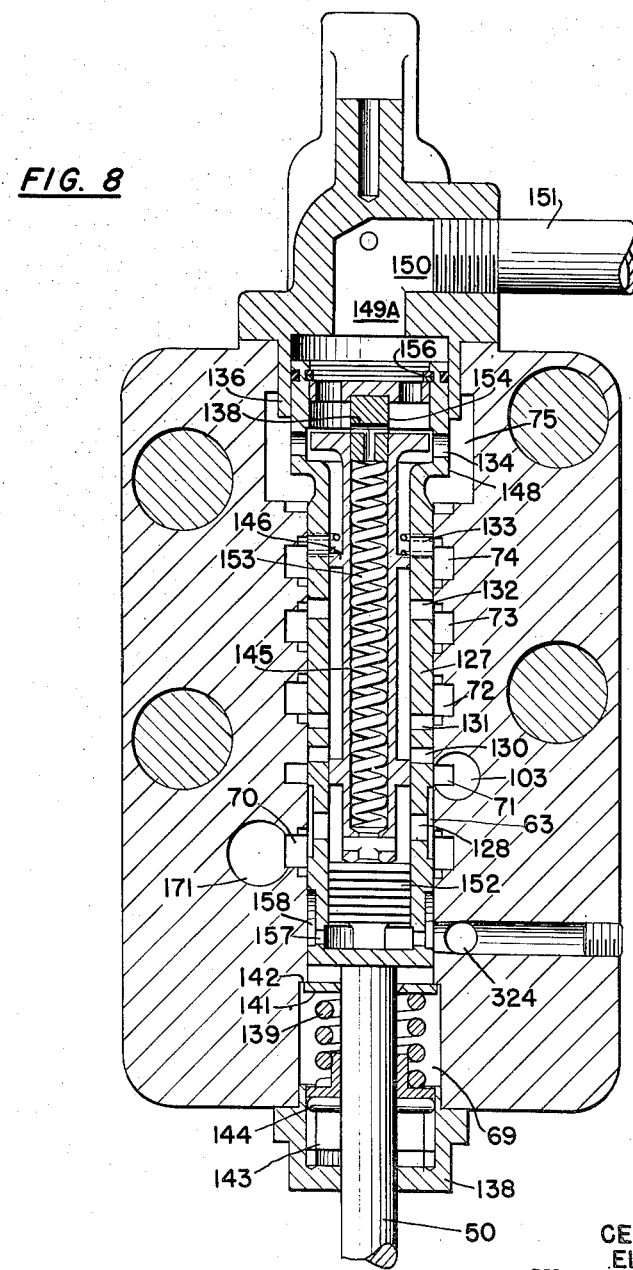
Figure 8 is a vertical transverse sectional view taken through the valve in the plane indicated by the line VIII—VIII of Figure 7.
Figure 9:
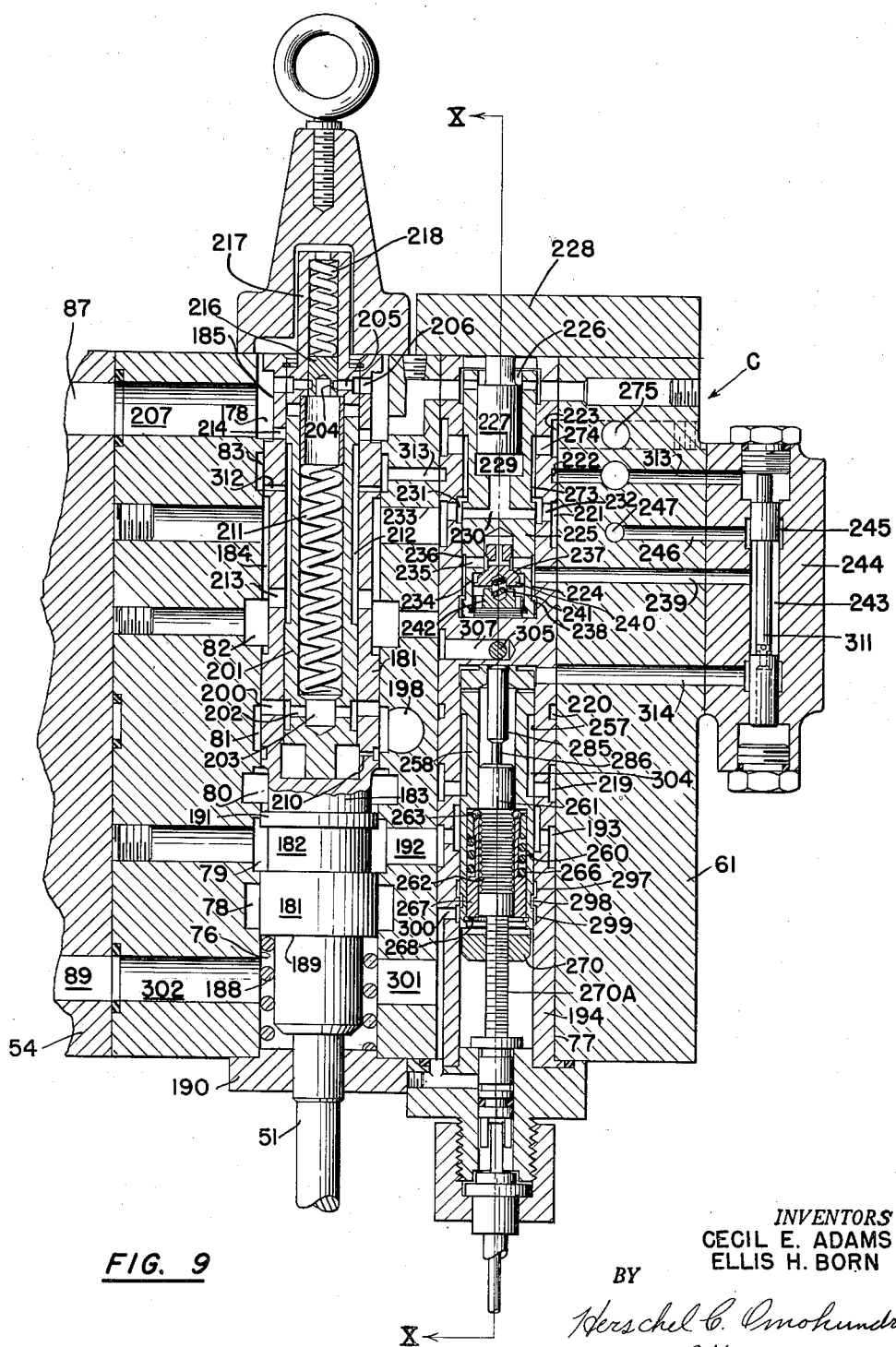
Figure 9 is a detail vertical sectional view taken through another portion of the valve on the same plane as that on which Fig. 7 was taken, the parts of the valve being shown in the same relative positions.

Piece 61, which is secured to the rear face of subplate 54, is also provided with a pair of parallel vertical bores 76 and 77, see Fig. 9, bore 76 being surrounded by a plurality of longitudinally spaced annular recesses 78 to 83, inclusive. Certain of the recesses surrounding bores 62 and 63 in piece 60 are connected by openings formed in piece 60, while certain other recesses are connected by passages with other passages formed in the subplate and an attachment block 84 secured to the front surface of piece 60. These passages and recesses in pieces 54, 60 and 61, together with the bores, combine to form the hydraulic system illustrated diagrammatically in Fig. 6C. The passages which establish communication between the various recesses are shown in the sectional views taken through the valve as illustrated in Figs. 7 to 17, inclusive.

The rear surface of piece 60 is designated by the numeral 85. As illustrated in Figs. 7, 11, 12, 13, 14 and 16, certain of the passages formed in piece 60 lead to the surface 85 to connect with other passages formed in the subplate 54; for example see Figures 7 and 14, recess 75 is connected by passage 86 with a passage 87 formed in the subplate, this passage extending completely through the subplate and opening to the rear surface thereof. Passage 87 is intersected by a vertical passage 88 formed in the subplate, which passage 88 connects at its lower end, see Fig. 15, with a short horizontal passage 89 communicating at its inner end with a rearwardly directed passage 90, this passage in turn connecting with a passage 91 formed in the motor support 52. The passage 91 is directed downwardly and connected by a conduit 92 with the reservoir; thus fluid introduced into passages 86, 87, 88, 89 or 90 will be conducted into the reservoir, these passages may correctly be termed "outlet," "discharge" or "low pressure" passages and combine to form the tank line F shown in the diagrammatic Figs. 6A, 6B and 6C.

As illustrated in Fig. 12, recess 74 connects with a short passage 93 leading to the surface 85 and registering with a second short passage 94 formed in subplate 54 which communicates with a rearwardly directed passage 95. This passage 95 terminates in registration with the end of passage 56 which leads to the upper end of the cylinder 26. This combination of passages forms the top cylinder line designated by letter I in the diagrammatic Figs. 6A, 6B and 6C.

Figure 11:
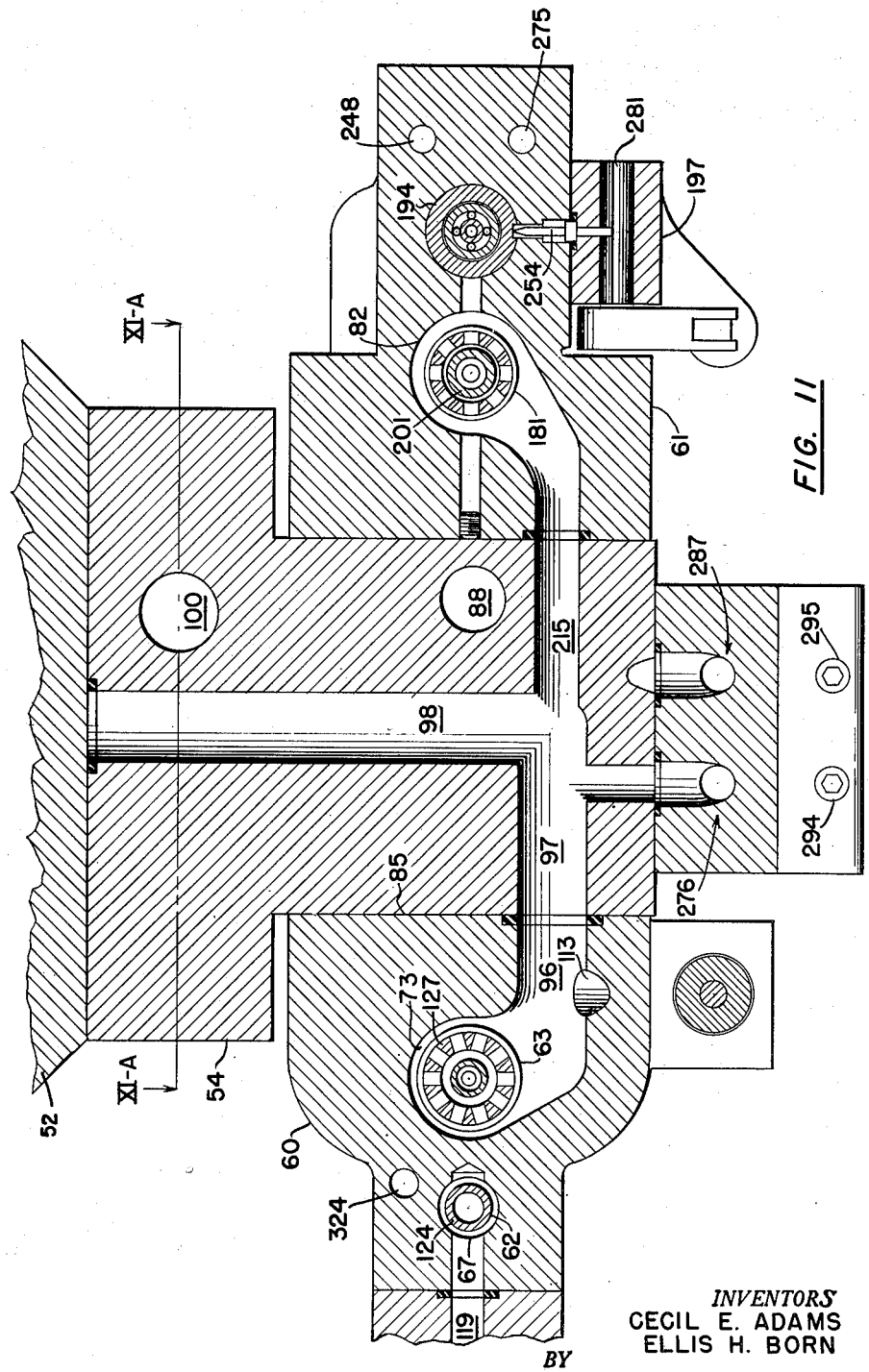
Figure 11 is a detail horizontal sectional view taken through the completed valve on the plane indicated by the line XI—XI of Fig. 7.
Figure 11A:
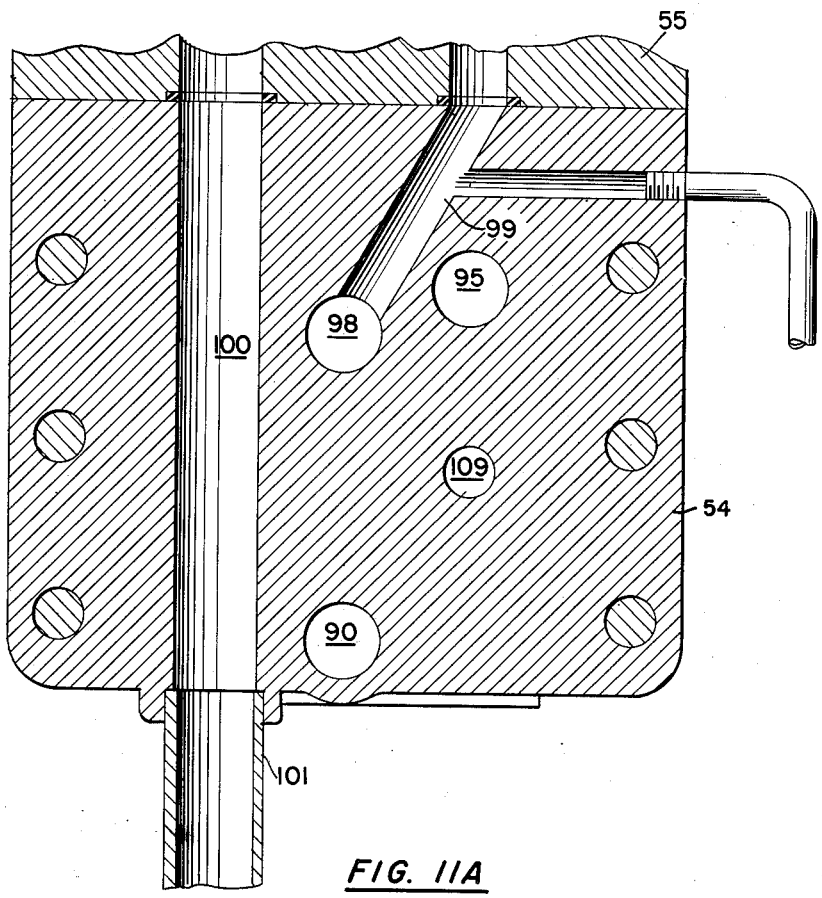
Figure 11A is a detail vertical sectional view taken through the subplate portion of the valve on the plane indicated by the line XI-A—XI-A of Fig. 11.

Recess 73 in piece 60 is connected as shown in Fig. 11 by a short passage 96 with passage 97 in subplate 54, passage 97 communicating with a horizontal passage 98 formed in subplate 54. Passage 98 extends laterally in the subplate, terminating at the wall surface in engagement with the motor support. This passage 98 communicates, as shown in Fig. 11A, with an angularly extending passage 99 which terminates in the upper surface of the subplate, the outlet of pump 55 communicating with this angular passage. The pressure line formed by these passages is indicated in the circuit diagrams by the letter D. The inlet of pump 55 communicates with a vertical passage 100 extending through the subplate 54, the lower end of this passage being connected with a conduit 101, communicating with both the cooler 34 and reservoir 25. When the pump 55 is operated, fluid from the reservoir will be drawn into the pump and discharged from this member through passage 99 into passage 98, through which it will flow to passages 97 and 96. Fluid under pressure is thus supplied to recess 73 at all times during the operation of pump 55.

Figure 7:
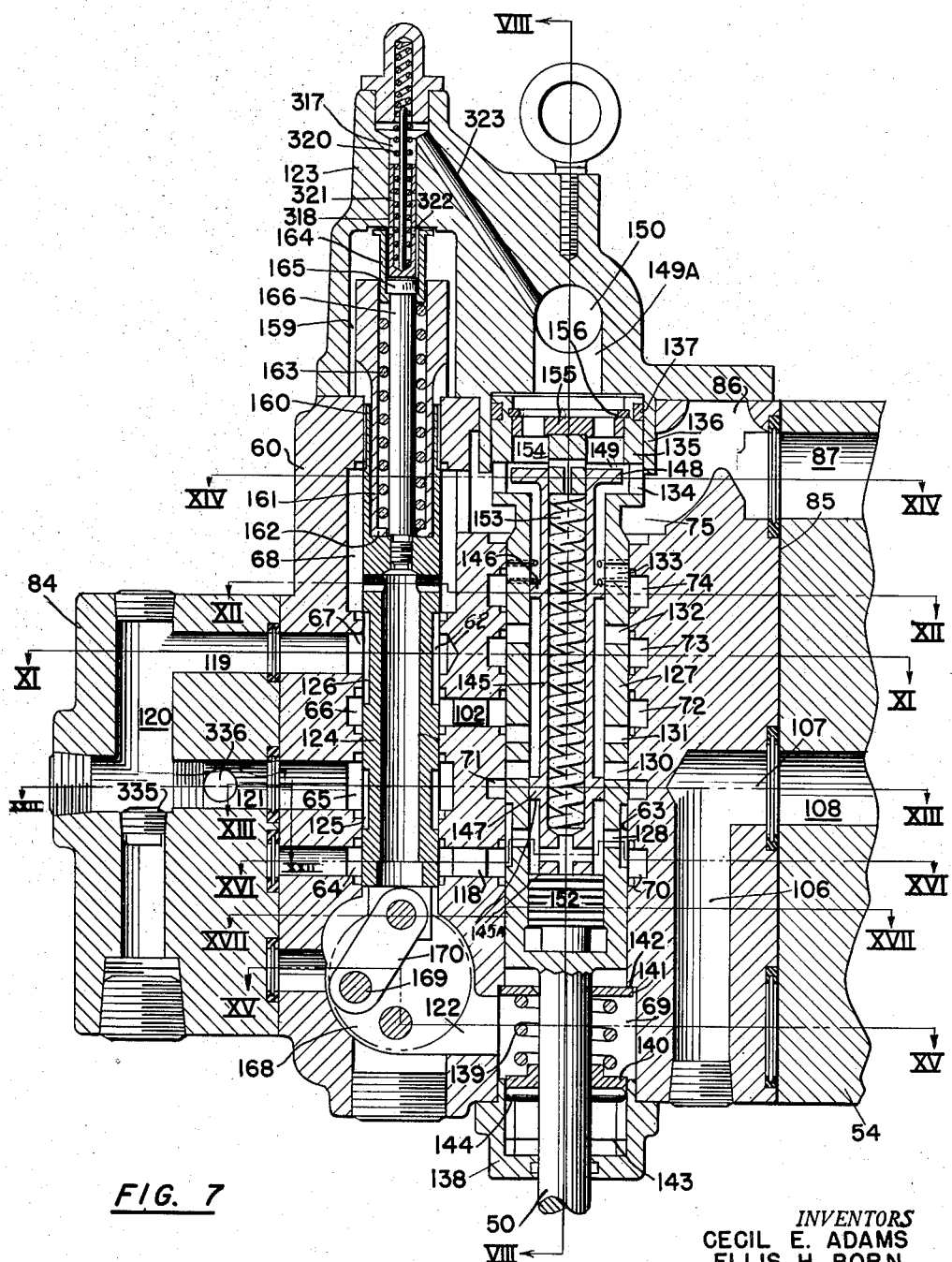
Figure 7 is a detail vertical sectional view taken through a portion of the automatic control valve used in the press shown in Fig. 1.
Figure 13A:
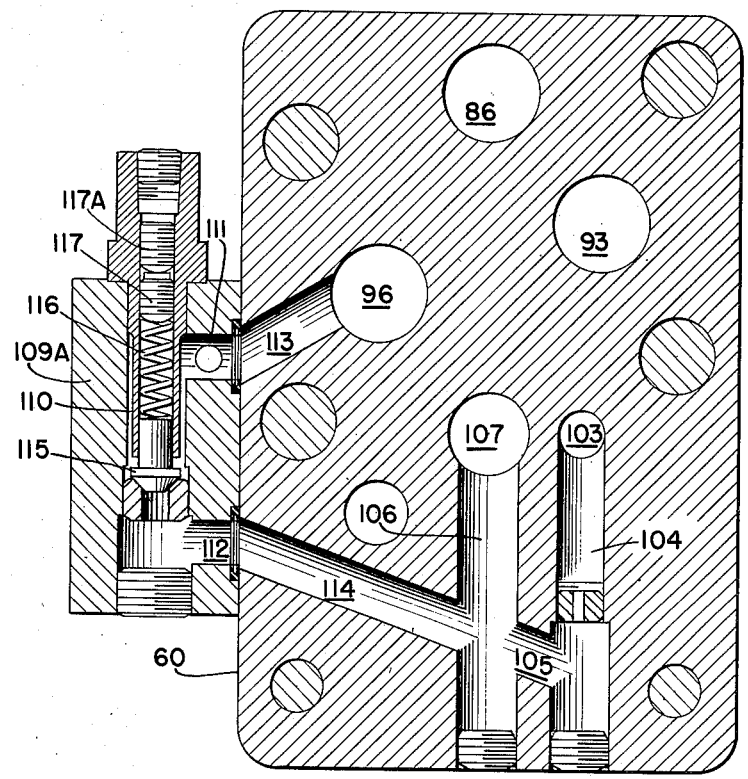
Figure 13A is a detail vertical sectional view taken through a portion of the valve on the plane indicated by the line XIII-A—XIII-A of Fig. 13.

Recess 72, see Fig. 7, is connected by a short duct 102 with recess 66 which surrounds bore 62. Recess 71 is connected as shown in Fig. 13 by a series of drilled holes 103 to 107, inclusive, with a hole 108 formed in the subplate 54. This hole connects with one end of the passage 109, the opposite end of which communicates with passage 57 formed in the motor support 52, passage 57 leading to the lower end of the cylinder 26. In the circuit diagrams, this series of passages is designated by the letter J and is some times referred to in the description as the bottom cylinder line. As illustrated in Fig. 13A the fluid passage leading from recess 71 to the lower end of the power cylinder is connected by a shunt line with passage 96 to which fluid under pressure is supplied by the pump 55. This shunt line indicated in the circuit diagrams by the letter Q has a portion formed in a block 109A secured to the side of piece 60. Block 109A has a vertical bore 110 formed therein and lateral ports 111 and 112 communicating with the bore 110 at its upper and lower ends; ports 111 and 112 communicate with angularly related passages 113 and 114 formed in piece 60, 113 communicating with passage 96, and 114 connecting with passage 106. Bore 110 contains a spring-pressed check valve 115 which will permit fluid flow only from passage 106 to passage 96, reverse flow being precluded. The tension of spring 116, which is used to maintain valve 115 seated, may be varied by adjustment of a set screw 117, this adjustment being locked by a second set screw 117A. The purpose of this shunt passage and check valve has been set forth above in the general description of the operation and will also be referred to in the following description.

Recess 70 in body 60 is connected by an opening 118 with recess 64 surrounding bore 62; the purpose of this connection will be obvious from the following description: Recesses 65 and 67, which also surround bore 62, are connected by means of an attachment block 84 in which a plurality of passages 119, 120 and 121 are formed. These passages are drilled in the blocks 84, 119 and 121 extending horizontally and intersecting passage 120 which is formed vertically; the outer ends of certain of these passages are closed by suitable pipe plugs. The lower ends of bores 62 and 63 are connected by a cored opening 122. Upper end of body 60 has a cap 123 secured thereto to close the open upper ends of bores 62 and 63, certain other functions also being performed by this cap.

Bore 62 receives a spool 124 for sliding movement, this spool being hollow and having longitudinally spaced annular grooves 125 and 126 formed in the outer surface. These grooves serve to establish communication between certain of the recesses surrounding bore 62 in different longitudinal positions of adjustment of spool 124. In the position of spool 124 shown in Fig. 7, which is the neutral or inactive position of the valve mechanism, groove 126 establishes communication between recess 66 and recess 68, the purpose of this communication will be set forth hereafter.

Bore 63 slidably receives a sleeve member 127 in which a plurality of laterally directed ports 128 and 130 to 134, inclusive, are formed. Sleeve 127 has a head 135 formed on its upper end, which head is slidable in a recess formed in a boss 136 projecting downwardly from cap 123, this boss projects into the recess 75 and through cooperation with the head 135 and a piston ring 137 carried thereby, serves to seal the upper end of the head 135 from the recess 75. The purpose of this seal will be pointed out later in this description.

The lower end of spool 127 is closed and is connected directly to the upper end of the shipper rod 50; this rod projects through a cap 138 used to close the open lower end of the bore 63, a coil spring 139 being arranged in bore 63 at recess 69 to urge spool 127 toward a certain position. This spring engages, at one end, a collar 140 surrounding rod 50 and at the opposite end engages a washer 141 which is held against a shoulder 142 formed in the bore 63. Collar 140 has opposed slots 143 formed therein, these slots receiving a transversely extending pin 144 carried by rod 50. When rod 50 is moved in an upward direction the pin 144 engages the ends of the slots in the collar and moves it upward in opposition to the spring 139, this member being engaged with washer 141 to prevent upward movement of its upper end. The spring will thus be compressed and will tend to move rod 50 and sleeve 127 connected thereto in a downward direction. If rod 50 is moved downwardly, the lower end of sleeve 127 will engage washer 141 and again compress spring 139; the tendency of this spring to expand will urge the sleeve in an upward direction. It will thus be seen that spring 139 tends to hold sleeve 127 in a position wherein the lower end of the same coincides with shoulder 142.

Sleeve 127 has a shuttle valve spool 145 slidably positioned therein, this spool being formed with upper and lower spaced land sections 146 and 147. This spool has a piston head 148 at its upper end which closely fits the opening formed in the head 135 of sleeve 127 in the highest position of movement of spool 145. The head 148 is normally disposed in registration with an enlarged recess 149 in the inner end of head 135. While so positioned open communication between the interior of the sleeve and the opening in the head 135 is maintained. When the spool 145 is elevated until the head 148 enters the opening in head 135, such communication will be prevented; the reason for this is set forth in the following description.

It will be seen from a study of Figs. 6A, 6B, 6C, 7 and 8, that the cap 123 has a recess 149A which registers and communicates with bore 63 when the cap is in place. Recess 149A is connected by a horizontal passage 150 and line 151 with the reservoir 25. This arrangement provides an extra exhaust outlet directly connected with the reservoir in which atmospheric pressure is maintained. When the spool 145 is in elevated position and the head 148 thereof is in the opening in head 135, substantially atmospheric pressure exists above the head.

The press, when operated as a heavy capacity press, utilizes fluid under high pressures and when the valve mechanism operates as pointed out in the general description of the operation to reverse the direction of ram movement, particularly from pressing to retraction strokes, fluid under high pressure is directed from the power cylinder into a tank line F containing fluid under low pressure. This discharge when first initiated, causes a strong shock which tends to prematurely deteriorate the mechanism as well as cause faulty ram action and noise. To counteract this objection a special type of shuttle valve spool 145 is provided, this spool having a piston head 148 at the upper end. The shuttle valve spool 145 is arranged for sliding movement in the sleeve valve 127, the latter being provided at its upper end with a chamber section for slidably receiving the head 148 on the shuttle valve spool 145. The upper end of the sleeve valve is received for sliding movement in the bore therefor and is provided with the piston ring 137 to effect a good seal between the sleeve and the casing. The upper end of the bore for the sleeve valve is connected with a line which communicates with the reservoir. This line has substantially atmospheric pressure at all times. The bore for the sleeve valve is also connected at a point below the piston head 148 on the shuttle valve with the normal exhaust line F through which fluid is normally discharged. While the latter line communicates directly with the reservoir 25 the fluid pressure therein may be somewhat higher than atmospheric pressure. It will be apparent from the drawings that when the shuttle valve 145 is elevated to connect the fluid pressure supply line D with the top cylinder line I, the shuttle valve head 148 will be disposed in the chamber therefor in the upper end of the sleeve valve. The top of this head is thus exposed to the pressure existing in the exhaust line in which pressure is substantially atmospheric. At this time the underside of the head will be exposed to the fluid pressures existing in the normal exhaust line F. Now, when the ram reaches the end of a pressing stroke and pressure is built up to cause the ram to exert the predetermined tonnage, the exhaust of fluid will stop, the back pressure which holds the shuttle elevated will be dissipated and the shuttle valve will start to move downward under the influence of its spring 153. When the upper land 146 on the shuttle valve 145 moves downward far enough to begin to expose the upper edges of the openings 133 in the sleeve valve 127 which communicate with the top cylinder line I, fluid will start to flow from the top cylinder port 74 to the normal exhaust line F. Since this line contains fluid which is almost static at this time the flow of fluid from the top cylinder port thereinto will tend to increase the pressure in the space in the sleeve beneath the shuttle valve head. This pressure acting on the underside of the shuttle valve head 148 offers resistance to the movement of the shuttle valve in response to the force of its spring.

This resistance is sufficient, when the fluid pressure at which the press is operating requires it, to retard the shuttle in its downward movement to the extent that the pressure in the exhaust line will be prevented from increasing enough to cause the shock mentioned above. When the flow through the normal exhaust line has accelerated sufficiently to prevent the pressure from increasing, the shuttle will complete its downward movement.

It will be observed that the width of land 146 on the shuttle valve spool is less than the diameter of the ports 133 and therefore as the shuttle moves downwardly, the supply line D will be connected through the top cylinder ports with the normal exhaust line F, the fluid flowing from beneath land 146 into the top cylinder ports and back into the sleeve above such ports. In this manner the energy stored in the fluid in the upper end of the power cylinder 26, in the top cylinder line I and in the supply line D will be dissipated before the downward movement of the shuttle is completed, to preclude objectionable shock when reversal of the ram movement occurs. Since the energy, in the form of pressure, in the supply line has been diminished before the supply line is connected with the bottom cylinder port, by the lowering of the shuttle valve, no shock will result when such connection is established.

The lower end of the hollow sleeve 127 has a piston 152 positioned therein for the purpose of elevating the spool 145 during the ram inching operation previously set forth. Spool 145 and piston 152 are normally retained in their lowermost positions by a coil spring 153 disposed in the shuttle spool 145 between the lower, inner end wall of a socket therein, and an orifice plug 154 at the upper end of the spool. This orifice plug 154 is retained in the spool 145 by a perforated plate 155 and snap ring 156. The orifice plug 154 has a T-shaped passage provided therein, this passage being open when the spool 145 is in its lowermost position, and closed upon initial movement of the spool in an upward direction.

When the shuttle valve occupies its lowered position and the passage in the plug 154 is open fluid resulting from leakage will be prevented from accumulating at the lower end of the shuttle valve and building up pressure sufficient to elevate the shuttle and cause an undesired pressing stroke. As shown in Fig. 8, sleeve 127 has a pair of laterally directed ports 157 which communicate with recesses 158 formed in the sides of the sleeve 127, the ports 157 opening to the interior of the sleeve 127 at the lower end of piston 152.

In certain operation, hereinafter termed ram "inching" operations, fluid is introduced through the ports 157 to the space beneath the piston 152 to move the piston and the shuttle valve 145 in an upward direction. To supply fluid pressure for moving piston 152, a hand pump effect is secured by moving the spool 124 upwardly beyond the point where communication between recess 68 and a chamber 159 in cap 123, through grooves 160 in spool 124, is interrupted. The movement of the upper end of spool 124 into chamber 159 after this communication is interrupted displaces fluid from the chamber 159 through the passage previously designated by the letter N to the recesses 158 from which it will flow through the ports 157 to the space beneath the piston 152. This fluid will urge the piston and consequently the shuttle valve 145 in an upward direction. By controlling the extent of movement of the spool 124 the distance moved by the valve 145 may be controlled. In this manner the degree of communication between the supply line D and the top cylinder line I may be regulated to govern the speed of movement of the ram. The rate of retraction of the ram may be controlled also by regulating the movement of the spool 124 in a downward direction after having been once elevated to cause the ram to move downward.

Spool 124 is normally biased toward the position in which it is shown in Fig. 7 by a spring assembly having a sleeve 161 with a reduced lower end disposed in a socket formed in the upper end of the spool 124. Sleeve 161 has an internal flange 162 at its lower end for engagement by a coil spring 163 arranged within the sleeve. The upper end of this coil spring engages a thimble 164 which also has an internal flange for engaging the underside of a head 165 provided on a bolt 166, this bolt being threaded into an opening formed in spool 124. The upper end of thimble 164 has an external flange for engaging the end wall of the chamber 159 formed in the cap 123 around the upper end of the sleeve 161. When the spool 124 is moved in an upward direction, the thimble 164 is retained against movement by the cap 123 and spring 163 will be compressed, the tendency for this spring to expand applying a force to the spool 124 to move the same in a downward direction after the upward force is discontinued. When the spool 124 is moved downwardly from the position shown in Fig. 7 the head 165 of bolt 166 will draw the thimble 164 downward compressing spring 163. Due to this compression, the spring will tend to move spool 124 in an upward direction back to the original position.

Spool 124 is moved by rotating a disk 168 on which a crank pin 169 is eccentrically located. This crank pin receives a connecting link 170 which is also pivoted to the lower end of the spool 124. It should be obvious that when the disk 168 is turned, spool 124 will be moved upward or downward depending upon the direction of rotation of disk 168. When the ram 44 of the press is in an elevated position and the press is idle, spool 124 and sleeve 127 will be in the positions shown in Fig. 7. At this time recess 73, to which fluid is supplied under pressure by the pump 55, communicates with recess 72 through ports 132, the interior of sleeve 127 and ports 131 so that fluid supplied to recess 73 will be conducted to recess 72 from which it may flow through opening 102 to recess 66; groove 126 in spool 124 conducts this fluid to recess 68 which is in open communication with recess 75 and the fluid will thus flow through recess 75 and passage 86 to passages (Figures 14 and 15) 87, 88, 89, 90 and 91, and tube 92 to the reservoir 25, the pump 55 will then operate under a minimum load. If it is desired to initiate a pressing operation by ram 44, disk 168 is rotated to move spool 124 in a downward direction. When the spool moves down far enough to interrupt communication between groove 126 and recess 68 the fluid under pressure admitted to recess 66 will be directed through recess 67, passages (Fig. 7) 119, 120, and 121, to recess 65. This fluid under pressure will then be conducted through groove 125 to recess 64 from which it will flow through passage 118 and recess 70 then through ports 128 into the interior of sleeve 127 at the lower end of shuttle valve 145. The force of this fluid will be exerted on the underside of the shuttle valve 145 and will move the same in opposition to the force of spring 153, in an upward direction until the space between lands 146 and 147 on the shuttle valve establishes communication between ports 132 and 133. Fluid under pressure may then flow from recess 73 through ports 132, the interior of sleeve 127, through ports 133 to recess 74 (Fig. 12). From this recess the fluid will flow through passages 93, 94, 95 and 56 to the upper end of power cylinder 26, the force of this fluid being exerted on piston 43 to move the same in a downward direction, ram 44 also moving in this direction with the piston. Fluid underneath piston 43 will flow outwardly through passages 59 and 57 (Figures 5 and 13) to passages 109, 108, 107, 106 to (Fig. 13A) passages 114 and 112. This fluid will flow past check valve 115 into passages 111 and 113 where it will combine with the fluid supplied by the pump to passage 96 and be directed therewith into the upper end of the power cylinder. Through the provision of the shunt line containing check valve 115, the effective area of piston 43 is reduced to the area of the ram 44. The rate of movement of piston 43 and ram 44 will thus be increased since the full volume of fluid supplied by the pump will be available over the reduced area.

Upon initial downward movement of the ram 44, bar 47 will move away from a collar 50A provided on shipper rod 50 permitting spring 139 to shift sleeve 127 to the normal position illustrated in the diagrammatic Figs. 6A, 6B and 6C. When the sleeve is moved to this normal position ports 131 no longer communicate with groove 72 but ports 130 communicate with the bottom cylinder groove 71. The instant piston 43 starts to descend the resistance to the flow of the exhaust fluid from the lower end of the power cylinder caused by the spring pressed valve 115 will create a back pressure which will be transmitted through ports 130 to the interior of the sleeve 127 beneath the shuttle valve 145. This back pressure beneath the shuttle valve acts on the downwardly facing end area 145A of the valve 145 and head 147 and serves to retain the shuttle valve in its elevated position after sleeve 127 moves downwardly and discontinues fluid flow from the supply line to the chamber beneath the shuttle valve. Since the back pressure retains the shuttle valve elevated, the application of fluid from the source to the upper side of the piston will be continued. After the ram has descended a predetermined distance it is desirable to reduce the rate of travel thereof; this objective is secured by rendering the shunt line, i. e., (Figures 6C and 13A) passages 114, 112, 110 and 111, ineffective and directing the exhaust from the lower end of the power cylinder to the reservoir 25. To accomplish this purpose an outlet for the exhaust fluid from the lower end of the power cylinder is provided in which less opposition to the flow of fluid will be encountered than in flowing past the spring pressed check valve 115. This passage (see Fig. 6C) leads from groove 70 through an opening 171; this opening communicates with passage 172 extending transversely through the subplate 54 and connecting with an opening 173 provided in piece 61 secured to the back of the subplate 54.

Opening 173 communicates with the annular recess 80 surrounding bore 76 in piece 61. This bore 76 receives a sleeve-like spool 181 which is formed with a plurality of longitudinally spaced, external, annular grooves 182 to 185, inclusive, for the purpose of establishing communication between certain of the grooves around bore 76. Sleeve 181 is connected with the upper end of the shipper rod 51 which, as previously mentioned, extends downwardly through an opening 48 formed in the bar 47. The opening 48 is sufficiently large to permit a collar 186 carried by the rod 51 to pass therethrough. When the bar 47 moves downwardly in connection with the ram 44, a weight 187 is deposited on the collar 186 to move the same together with the shipper rod 51 and the sleeve 181 in a downward direction in opposition to a spring 188 disposed in the bore 76 at the lower end of the member 181. This spring has its upper end in engagement with a shoulder 189 formed on the sleeve member 181, the opposite end of the spring engaging a cap 190 employed to close the open lower end of the bore 76. As long as the weight 187 is supported by the bar 47, spring 188 will retain sleeve 181 in its upper position wherein it is shown in Fig. 9. While in this position the unreduced portion 191 of sleeve 181 below groove 183 prevents communication between recess 80 and recess 79.

When weight 187 is deposited on collar 186 spring 188 will be compressed and sleeve 181 moved downwardly to establish communication between recesses 80 and 79; fluid flowing to recess 80 will be admitted to recess 79 from which it will flow through opening 192 to an annular groove 193 formed in the outer surface of a liner 194 disposed in bore 77 of piece 61.

Figure 10:
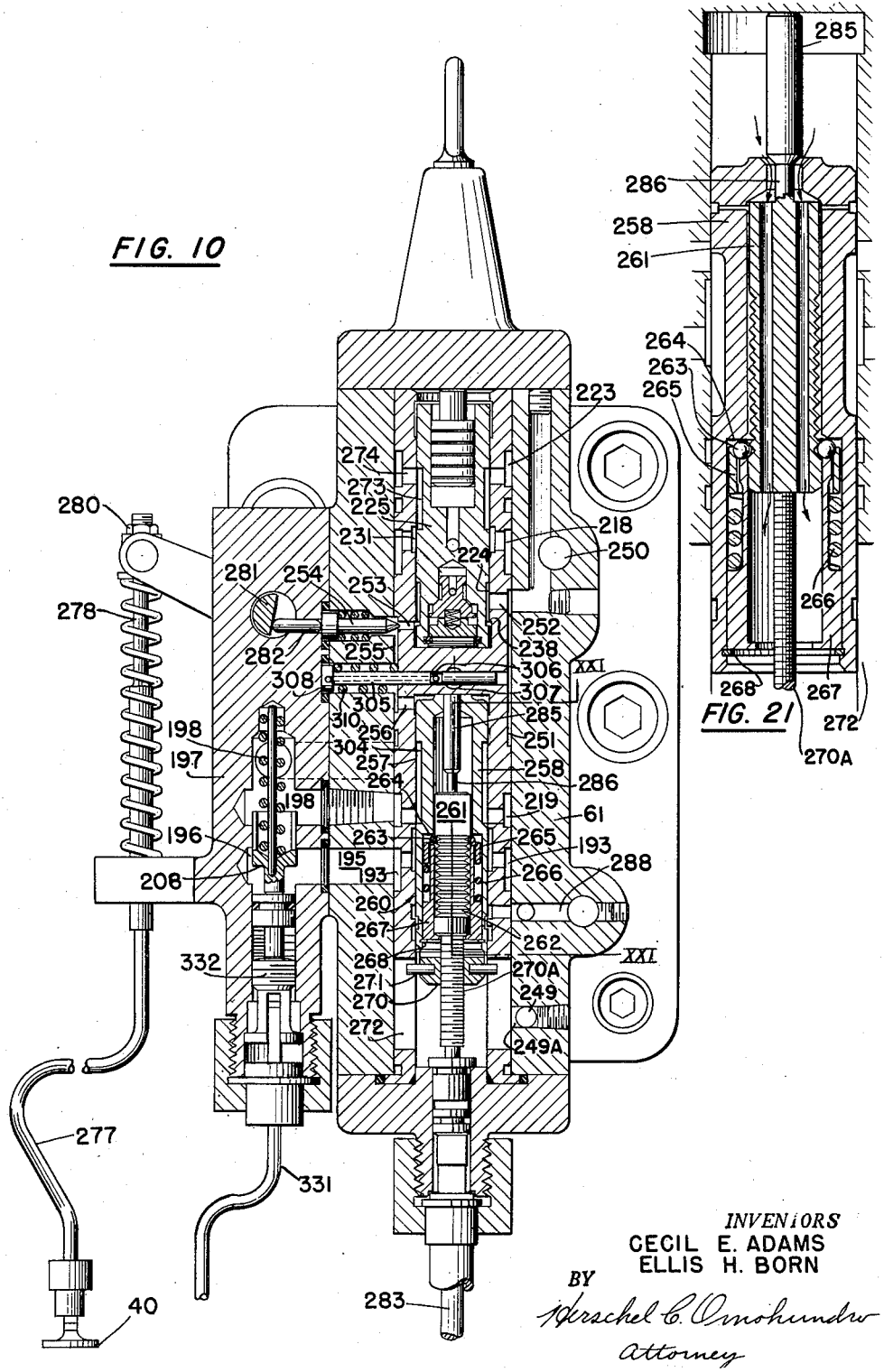
Figure 10 is a detail vertical transverse sectional view taken through the portion of the valve shown in Fig. 9 on the plane indicated by the line X—X of the latter figure.

When the parts of the valve are disposed in the positions shown in Figs. 9 and 10, fluid admitted to groove 193 will flow through lateral passage 195, shown in Fig. 10, the outer end of which communicates with a vertical bore 196 formed in a block 197 which is secured to the outer surface of piece 61. This bore 196 is connected at its upper end by a series of passages 198 which lead to groove 81 surrounding bore 76. Opening 192, groove 193, passage 195, bore 196 and passages 198 combine to form the line designated by the letter H2 on Fig. 6C of the drawings. Groove 81 communicates through lateral ports 200 with the interior of the sleeve 181. This sleeve receives a flow control spool 201 which is normally biased to a lower position in which it is shown in Fig. 9. The inner ends of ports 200 register with an annular groove formed in spool 201, ports 202 leading from this groove to an axial opening 203 formed in the spool. The fluid exhausted from the lower end of the power cylinder 26 through passages 59 and 57 will flow, see Fig. 13, through passages 109, 108, 107, 106, 105, 104 and 103 which compose line J in the diagram of Fig. 6C to groove 71. This fluid will flow through ports 130, the interior of sleeve 127, and outwardly through ports 128 to groove 70. From this groove the fluid will flow, see Fig. 16, through passages 171, 172, and 173 composing line H—1, in Figures 6A, 6B and 6C to groove 80, from which it will flow through groove 183 in sleeve 181 to groove 79 thence through line H2 which is formed by passage 192 (Fig. 9), groove 193, passage 195 (Fig. 10), bore 196 and passage 198, to groove 81 (Fig. 9); this fluid will then flow through ports 200 and 202 to opening 203 in spool 201. From this opening fluid will flow through a reduced orifice 204 which is formed in the flow resisting device designated by the letter L in the circuit diagrams and through ports 205 and 206 to recess 178 from which it will flow through passage 207 to passage 87 in subplate 54. Since passage 87 is connected, as previously described, with reservoir 25, the fluid will be exhausted to such reservoir.

Due to the reduced size of orifice 204, the back pressure previously caused by spring pressed valve 115 will be maintained, which pressure will obtain in the passages leading from orifice 204 back to the lower end of the power cylinder. This back pressure existing in the lower portion of sleeve 127 reacts, as previously described upon the lower end of the shuttle valve and retains the same in its elevated position to continue downward movement of the piston 43 and ram 44. Since the shunt line has been rendered ineffective due to the opening of the exhaust line to the reservoir, the fluid exhausted from the lower end of the power cylinder will be directed to the reservoir rather than being introduced into the upper end of the power cylinder. The effective area of piston 43 will thus be increased; since the entire piston area is rendered effective, the rate of travel will be correspondingly decreased.

In some instances it is desirable to further decrease the rate of piston and ram movement. This is accomplished by causing some of the pump volume to flow directly to reservoir 25 rather than to the cylinder 26 to act upon the piston 43, spring-pressed adjustable valve 208, arranged in bore 196, assisting in effecting this purpose. By adjusting valve 208 the back pressure may be increased in the passages between bore 196 and the lower end of the power cylinder, this back pressure obtaining in groove 80. Since sleeve 181 is in its lowered position at this time groove 80 will be in communication with the interior of the sleeve 181 beneath flow-control spool 201 through port 210 formed in sleeve 181. The back pressure obtaining in groove 80 will thus be applied to the lower end of the flow-control spool 201 to move the same upwardly in opposition to spring 211. When so moved, an external groove 212 in spool 201 will establish communication between ports 213, which communicate with groove 82, and ports 214 communicating with groove 178, groove 82 being connected by passage 215 with passage 98 which receives fluid under pressure from pump 55. When communication is established between grooves 82 and 178 via ports 213 in sleeve 181, groove 212 in spool 201 and ports 214 in sleeve 181, a portion of the pump discharge will be bypassed directly to the reservoir 25; the rate of ram movement will, therefore, be reduced. The degree of reduction will depend upon the adjustment of valve 208. If the valve is closed to a considerable extent, more resistance to fluid flow will be exerted and spool 201 will be moved to establish a greater degree of communication between the supply and exhaust lines, a greater volume of fluid from the pump will be bypassed and the speed of ram movement correspondingly reduced. If the valve 208 is opened fully, no pump volume will be bypassed and the ram will move at the full speed.

Orifice 204 is formed in a button 216 which is disposed for movement in a plug 217 positioned in the upper end of the sleeve 181 in slightly spaced relation from the upper end of spool 201. A coil spring 218 normally urges this button to its lowermost position, fluid pressure, however, is operative to move the button in opposition to the spring 218 to a position wherein the inner ends of ports 205 will be exposed to permit larger volumes of fluid to be exhausted than may flow through port 204; this constitutes a safety measure in that it prevents the creation of excessive back pressures. The strength of spring 218 is calculated to permit the orifice button to move to open ports 205 to prevent the building of back pressure sufficient to open valve 115. This back pressure, however, must be sufficient to retain the shuttle valve elevated. The orifice button also moves to open ports 205 to prevent excessive volumes of fluid from increasing the pressure to a degree which might cause injury to the mechanism.

With the mechanism thus far described, the press ram may be caused to reciprocate through its full stroke a single time or it may be caused to repeatedly reciprocate through a full stroke. It may also be caused to move rapidly during the initial portion of the power stroke then move at a controlled rate during the remaining portion of the power stroke by merely turning disk 168 to a position wherein grooves 66 and 67 will be continuously connected.

In some instances it may be desirable to cause the press ram to perform a working stroke followed by a series of short pressing strokes, after which the ram may return to initial starting position. This type of operation is secured with the mechanism disposed in bore 77 of piece 61. This mechanism includes the sleeve 194 in which external groove 193 and other grooves 219 to 223, inclusive, are formed. Liner 194 has a chamber 224 formed in its upper end in which a piston 225 is disposed for reciprocation. This piston has a recess 226 formed in its upper end in which a plunger 227 is disposed; this plunger engages a cap 228 secured to the upper end of piece 61. The inner end of recess 226 is connected by passages 229, 230, groove 231 and ports 232 in liner 194 with groove 221, this groove being connected by an opening 233 with bore 76 in registration with groove 184 formed in sleeve 181. Groove 184 establishes communication between opening 233 and groove 82, the latter groove being connected with the source of fluid pressure.

Piston 225 also includes a recess 234 in its lower end, this recess being connected by lateral ports 235 with an external groove 236 formed in the piston. A valve seat 237 is formed in the piston between the inner ends of ports 235 and the lower end of the piston. Chamber 224 is enlarged at its lower end to provide a shoulder 238, this shoulder cooperating with the shoulder at the lower end of groove 236 to seal off the lower end of chamber 224 from the groove 236 when piston 225 is moved in an upward direction a predetermined distance. Valve seat 237 is normally engaged by a check valve 240 which is urged toward the seat by a coil spring 241 disposed between the valve and an adaptor 242 retained in the lower end of piston 225.

Passage 239 communicates at one end with the chamber 224 at the groove 236 and at the other end with the intermediate portion of a vertical passage 243 formed in a block 244 secured to the body 61. Passage 243 communicates at its upper end with a recess 245 which in turn communicates with a passage 246 formed in piece 61. This passage intersects a transverse horizontal passage 247 which extends to a vertical passage 248, see Fig. 12. The latter terminates at its lower end in another horizontal passage 249, see Fig. 10, which in turn terminates in a passage 249A leading into the lower end of the bore 77. As illustrated in Fig. 12, the subplate 54 and body 61 are provided with connected passages 250 communicating with the inner end of the passage 95 forming part of the top cylinder passage I. Passages 250 communicate, as shown in Fig. 10, with bore 77 in registration with a longitudinal recess 251 formed in the liner 194, this recess communicating by way of a port 252 with the chamber 224 above the shoulder 238. As previously pointed out, the piston 225 has an annular groove 236 formed therein, this groove registering with the port 252. When the top cylinder passage 95 receives fluid under pump pressure to effect the downward movement of the ram some of this fluid will be directed by way of the passages 250 to the recess 251 from which it will flow through port 252 to the annular groove 236. This fluid flows through ports 235, past valve seat 237 to the lower end of chamber 224 and will exert an upward force on the piston 225 causing the same to move in an upward direction. This movement will take place even though the socket 229 is in direct communication with the supply line since plunger 227 is smaller in area than the piston 225.

In moving upward, the shoulder on piston 225 at the lower end of groove 236 will pass shoulder 238 and close off the lower end of the chamber 224 from communication with port 252 except through ports 235 and the recess 234 formed in the piston 225. This piston 225 is moved in the upward direction in this manner upon each power stroke of the ram due to the introduction of fluid under pressure to the top cylinder passage 95. After the ram has completed its power stroke the top end of the cylinder 26 will be connected with the reservoir, in the manner pointed out previously, when shuttle valve 145 is returned to its lower position in sleeve 127. When this connection is established, fluid from the pump will be directed to the lower end of power cylinder 26 where it will react on the piston to move the same in an upward direction. This motion of the piston discharges fluid from the upper end of the power cylinder through the top cylinder line, designated generally by the letter I in the circuit diagrams, which at this time is connected with the reservoir. As the lower end of the chamber 224 is connected with the top cylinder line the lower end of the piston 225 will be exposed to relatively low pressure. As previously mentioned, chamber 226 is connected with the supply line and at this time will receive fluid from the pump to effect downward movement of piston 225. To insure sufficient pressure in the supply line to cause movement of piston 225 and the elevation of the shuttle valve, the upward movement of piston 43 is resisted by placing a flow restrictor 43A in the top cylinder line. Thus when fluid from the pump is directed to the lower end of the power cylinder the pressure in the supply line and on the fluid will be sufficient to move piston 225 in a downward direction. The fluid beneath this piston will be exhausted through a lateral port 253 past a needle valve 254 to a groove 255 formed in the liner 194; this groove extends longitudinally of the liner and connects with a port 256 leading to the inner end of a socket 257 formed in the lower end of the liner 194.

Socket 257 slidably receives a spool 258 hereinafter termed the "stroke counting spool." Each time the piston 225 is depressed due to the connection of the top cylinder passage 92 with the reservoir 25 a certain quantity of fluid will be discharged by the plunger 225 into the upper end of the socket 257. This fluid will cause the stroke counting spool 258 to be depressed in the socket 257 against the resistance offered by detent mechanism 260 provided in the lower portion of the stroke counting spool 258. This detent mechanism includes a post 261 provided with a plurality of longitudinally spaced, annular grooves 262 for the reception of ball elements 263 surrounding the post between a shoulder 264 formed internally of the stroke counting spool and a collar 265 urged toward the shoulder 264 by a coil spring 266. The collar 265 surrounds the reduced portion of a sleeve 267 constituting an abutment member for the spring 266. The sleeve 267 is retained in the stroke counting spool by a snap ring 268.

The construction of the detent mechanism permits the stroke counting spool to be moved downward step by step, each step being of a predetermined length and occurring upon a return action of the piston 43. A stop nut device 270 surrounds an adjusting screw 270A which abuts the lower end of the post 261, this stop nut device being retained against rotation by pins 271 carried thereby and projecting into slots 272 formed in the liner 194. Due to the threaded connection between the nut 270 and the screw 270A and the restraint of the nut against rotation, this member will move longitudinally of the socket in the liner 194 toward and away from the lower end of the stroke counter upon rotation of the screw 270A. When the stroke counter is moved in a downward direction, the distance traversed will be determined by the setting of the stop nut device 270. If the stroke counting spool is stopped from moving in this manner before completing the maximum possible movement no outlet will be present for the fluid beneath the piston 225 and this member will be restrained also against downward movement until such time as the pressure beneath the same is relieved.

When the piston 225 is in its lowermost position a groove 273 formed in the exterior thereof establishes communication between groove 231 in the liner and ports 274 leading to groove 223. This groove is connected by a passage identified in the circuit diagram in Fig. 6C by the letter S and composed of drilled holes 275 which extend laterally, downwardly and laterally again to the groove 78 surrounding bore 76. When the sleeve 181 is in its lowered position groove 78 will be connected by grooves 182, 79 and 183 with groove 80, the latter being connected by a passage designated in Fig. 6C by the letter H1 and composed of passage sections 173, 172 and 171 with groove 70 surrounding the bore 63. Since groove 231 receives fluid under pump pressure at all times this fluid will flow along the path just outlined when piston 225 is in a lowered position, to groove 70 from which it will flow through ports 128 to the interior of the sleeve 127 beneath the shuttle valve 145. This fluid under pressure exerts an upward force on the shuttle valve causing the same to move to a position wherein the inlet port 73 which receives fluid from pump 55 will be connected with the top cylinder port 74 and fluid will be supplied to the upper end of the power cylinder 26. This fluid will cause the piston and ram to move downwardly expelling fluid from the lower end of the power cylinder in the manner described previously. This exhaust fluid is obstructed in its passage to the reservoir 25 by the orifice 204 so that a back pressure is built up which is utilized to retain the shuttle valve 145 in its elevated position until the ram 44 is obstructed in its power stroke. When this ram is obstructed with sufficient force to restrict its movement, fluid pressure will build up in the upper end of the power cylinder and the fluid passages connecting the same with the pump 55, until a relief valve 276 is operated to vent the pump discharge to reservoir 25.

Figure 20:
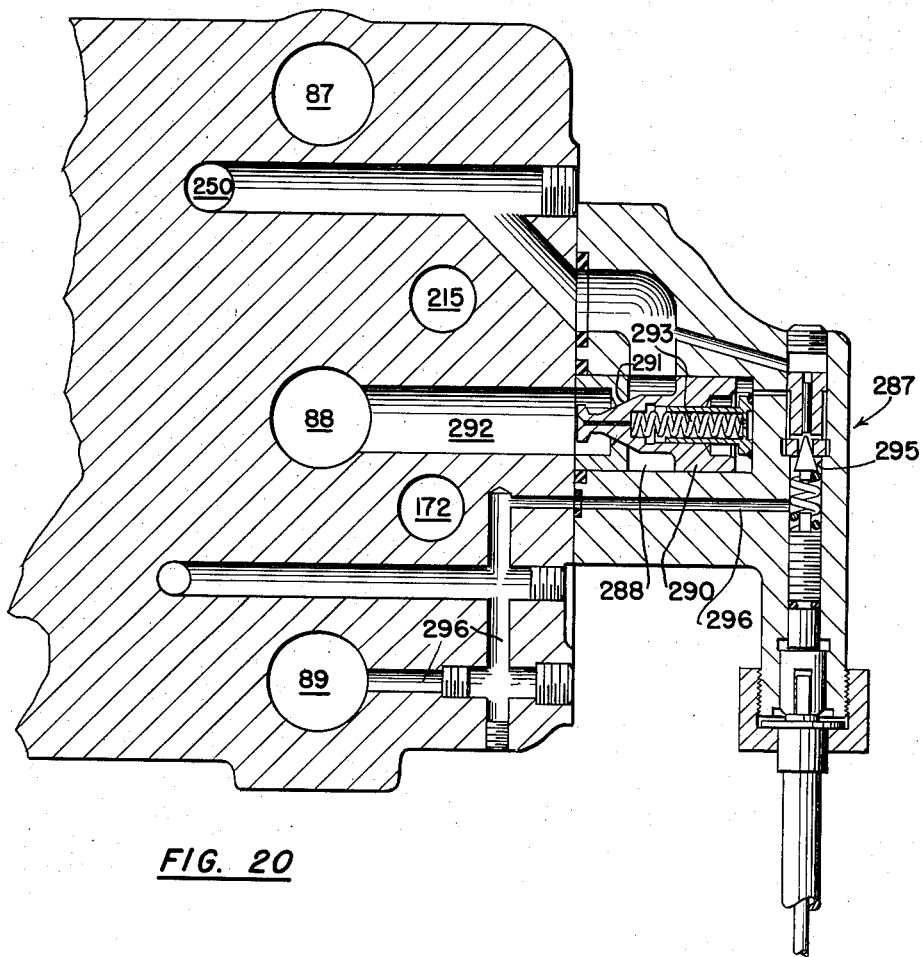
Figure 20 is a detail vertical sectional view taken through the subplate and relief valve secured thereto, the plane of the section being indicated by the line XX—XX of Fig. 13.

Relief valve 276 is illustrated in Fig. 13 and is similar in construction to the relief valve shown in Fig. 20. When this valve is operated in a manner to spill the pump discharge to the reservoir the press ram will be exerting the maximum tonnage for which the relief valve has been previously adjusted. When the ram stops moving the back pressure caused by orifice 204 will be dissipated therethrough permitting spring 153 to move the shuttle valve to its lowermost position wherein the source of fluid pressure will be connected with the lower end of the power cylinder 26; the ram will then move in an upward direction. When the shuttle moves to connect the fluid pressure source with the lower end of the power cylinder, the upper end of this member will be connected with the fluid reservoir as previously pointed out. At this time the force tending to move piston 225 in an upward direction will be dissipated and the piston will be moved downward by the fluid pressure under plunger 227, also as described previously. In its downward movement, piston 225 expels a certain quantity of fluid from the space beneath it into the space above stroke counting spool 258. The rate at which fluid is dispelled from the space beneath piston 225 will determine the distance travelled by the ram in an upward direction before the next succeeding pressing stroke is initiated. If fluid is discharged slowly, the upward or return movement of the ram will be lengthened since a longer time will be required for the groove 273 to again establish communication between groove 231 and ports 274. As long as this communication is interrupted, no fluid may be supplied to the interior of sleeve 127 beneath the shuttle valve 145 and the latter member will remain in its lowered position. After piston 225 has moved downward a distance sufficient to permit the shoulder at the lower end of groove 236 to pass shoulder 238 piston 225 will move rapidly since fluid displaced thereby can be readily discharged through passage 239 and the other passages connected therewith.

From the foregoing it will be apparent that the press ram may be caused to automatically execute one or a series of short reciprocatory pressing strokes at the termination of the initial pressing stroke on each cycle of operation, the number of short strokes being determined by the setting of the stop nut 270. The length of the short strokes may be regulated through the adjustment of the needle valve 254 which is performed by manipulating the knob 40 at the bottom of the control panel. The knob 40 is connected with a flexible cable 277 which is in turn connected with a threaded stud 278 received for adjustment in a stationary nut 280. The stud is connected with a lever pivotally mounted on block 197, the lever actuating a cam device 281 disposed for engagement with a push pin 282 which in turn engages needle valve 254. Movement of the cam regulates the position of valve 254 relative to passage 253 and consequently the rate of fluid flow from the recess 224 to chamber 257. The number of short strokes to be executed on each cycle is determined by the position of the stop nut device 270. This device is moved by rotating the adjusting screw 270A through the actuation of a flexible shaft 283 connected with a hand wheel 39 on the control panel.

Provision has been made to permit the press ram to operate continuously on short strokes. This mechanism, see Figures 9, 10, and 21, includes a reduced portion 285 which is connected with the body of the post 261 by a reduced neck 286. The stroke counting spool has an opening in its upper end for slidably receiving the reduced portion 285 during the greater portion of its travel in a stroke counting operation. If the stop member 270 is adjusted to provide the maximum movement of the stroke counting spool 258, this member will move until the opening in the upper end thereof registers with the neck 286 which will permit fluid introduced into the upper end of the socket 257 to pass through the opening in the stroke counting spool and be exhausted from the lower end of the bore 77 through passages 249A, 249 and 248, etc.

As mentioned in the objects it is sometimes desirable to cause the press ram 44 to exert a relatively light pressing force on the first stroke of a series then exert higher pressing forces on the succeeding strokes. To accomplish this type of operation, a second relief valve 287, see Figs. 6C, 13 and 20, has been provided, this relief valve being located in a casing secured to the end of the subplate 54, which casing also contains the relief valve 276. Relief valves 276 and 287 may be of conventional construction, each of those shown including a bore 288 for the slidable reception of a piston valve 290; this valve cooperates with a seat 291 to control fluid flow from the bore 288 to communicating passage 292 which are connected with passage 88, the latter passage being connected with passages 89, 90 and 91 leading to the reservoir 25. Piston valves 290 are normally urged toward the seats 291 by springs 293. The bore for valve 276 is connected directly to the line 98 leading from the pump 55 to groove 73; this relief valve 276 has a control chamber 294 which is vented to the reservoir 25 so that when the valve is adjusted for a predetermined pressure and such pressure is reached in passage 98, valve 276 will open to prevent the pressure from exceeding the predetermined figure. Only sufficient fluid is permitted to escape by the valve 276 as will maintain the pressure desired in passage 98.

The control chamber 295 of valve 287 is connected by a passage 296 with a groove 297 formed internally of the liner 194. When spool 258 is in its normal position, that is, fully elevated in the socket 257, an external groove 298 formed adjacent the lower end thereof will establish communication between groove 297 and a second groove 299 also formed internally in the liner 194. When groove 299 is connected to groove 297 in this manner, fluid may flow from the control chamber 295 through line 296 to grooves 297 and 299; this fluid will then flow through a lateral port 300 to a longitudinal groove formed in liner 194. This groove communicates with the lower end of bore 76 by a short passage 301, the bore 76 also communicating with a lateral passage 302 which in turn communicates with the passage 89 formed in the subplate 54. As previously mentioned, passage 89 connects with passages 90 and 91 leading to reservoir 25. When fluid is permitted to be exhausted from control chamber 295 of the relief valve 287, this relief valve will control the pressure which may be generated in the upper end of the power cylinder 26 since the chamber 288 of valve 287 is directly connected by passage 303 with the line leading to the top of the power cylinder 26. It is obvious that this relief valve 287 may be set to vent the fluid to the reservoir 25 at a lower pressure than relief valve 276 if desired. When so adjusted and the stroke counting spool 258 is in its normal elevated position, fluid may flow from the control chamber of the relief valve 287 permitting this valve to bypass fluid to the reservoir when the predetermined pressure for which it has been set is reached. After one pressing stroke is completed, the stroke counting spool will be moved down one step, as previously described, and this movement will cause groove 298 to be disposed out of communication establishing relation between grooves 297 and 299. Since fluid can not then flow from the control chamber of the valve 287, this valve will be precluded from operating and the ram 44 will be caused to exert the force determined by the setting of the relief valve 276. To prevent leakage from permitting an undesired operation of the valve 287, line 296 is connected with the top cylinder line by a line containing a reduced orifice 303A through which fluid loss will be replaced. It will be noted that the stroke counting spool 258 has an external groove 304 which establishes communication between ports connected with groove 219 and 193, after the spool 258 has been depressed one step. When this communication is established, and passage 198 is unplugged, the valve 208 will be bypassed, the flow control mechanism being thus rendered ineffective. The succeeding pressing strokes will be executed at normal ram speed.

After the predetermined number of vibratory or short reciprocatory strokes have been executed and the ram returns to its normal elevated position the stroke counting spool will be released and returned to its normal elevated position wherein the groove 298 will again establish communication between groove 297 and 299. On the next succeeding cycle of operation the decreased force will again be exerted by the ram 44 on the first pressing stroke.

The resetting of the stroke counting spool for succeeding operation is performed by connecting the upper end of the socket 257 to the top cylinder line at the termination of a return stroke of the ram 44 and supplying fluid under pressure to the lower end of the socket 257. After the series of short reciprocations of the ram has been completed, the piston 225 will be held in its elevated position in which communication between groove 231 and ports 274 is interrupted. The piston will be maintained in this position until the ram completes the return stroke, or, at least approaches the upper end of such a stroke. To retain the piston 225 in the elevated position use is made of a pressure operated valve 305 which is disposed for movement in registering openings formed in the liner 194 and body 61. Valve 305 comprises a stem having an annular groove 306 formed intermediate the ends, the groove being disposed adjacent an opening 307 extending into the liner 194 from one side. Stem 305 has a head 308 on one end against which a light coil spring 310 bears. This spring also being engaged with the side of the liner 194. Normally the coil spring serves to hold the valve 305 in closed position as illustrated in Figure 10. Under normal conditions the opposite ends of the valve 305 are exposed to equal pressures and the valve is maintained in its closed position by the force of the coil spring.

When the spool 258 has been depressed until it engages the stop member 270, fluid will be trapped in the chamber at the upper end of this spool, which chamber is connected with the chamber in the lower end of piston 225. It is this trapped fluid which maintains piston 225 in the elevated position. At the termination of a series of short strokes, the top cylinder line will be connected with the reservoir 25 and since this top cylinder line is connected with the end of the opening for spool valve 305 opposite that engaged by the spring, the top cylinder line pressure will be applied to this end of the spool valve. As previously described fluid at inlet line pressure is supplied to the chamber 229 in piston 225 and the force of this fluid tends to move piston 225 in a downward direction, causing a discharge of fluid from the inner end of the chamber for the piston into the upper end of the chamber 257 through the passage 255, the end of spool valve 305 engaged by the spring being exposed in the pressure in this passage. The spool valve 305 is thus exposed at its opposite ends to a pressure differential, the higher pressure of which is applied to the spring end of the valve. This higher pressure moves this valve to an open position, wherein fluid at inlet line pressure is applied to the chambers for the piston 225 and spool 258. This application of fluid pressure prevents movement of the piston 225 due to loss of fluid through leakage, or, other causes. Since piston 225 is thus prevented from moving, groove 231 will be prevented from communicating with ports 274 and causing an undesired reciprocation of the ram. The stroke counting spool 258 will be reset for subsequent operation by the dissipation of the pressure in the upper end of the chamber 257 and the introduction of fluid pressure into the lower end of this chamber which will occur when the ram approaches the upper limit of its return stroke. The fluid pressure in the upper end of socket 257 will be lowered when valve 305 is closed. This valve closes when pressures at opposite ends of the valve stem are equalized, which occurs when the upper end of the socket 257 is connected with the top cylinder port by the depressing of valve 311 see Fig. 9 which is located in passage 243 formed in block 244. After the stroke counting spool 258 is reset the movement of piston 225 downward will have no effect on the operation of the ram since the communication between grooves 78, 79 and 80 is then interrupted due to the return of sleeve 181 to its upper position.

At the beginning of a cycle of operation, valve member 311 disposed for sliding movement in the bore 243 is held in a depressed state by pressure fluid from the pump introduced into the upper end of bore 243 from groove 82 through ports 213 in sleeve 181 around the flow control spool 201, through lateral ports 312 to groove 83 which surrounds bore 76, and through a horizontal passage 313 extending in the upper end of passage 243. When valve member 311 is depressed in this manner, communication between passages 239 and 246 is interrupted while communication between the upper end of the socket 257 and passage 239 which is connected by chamber 224, port 252 and passage 250 (see Fig. 10) with the passages 95 and 56, (see Figures 12 and 5) leading to the upper end of the cylinder 26, is established through passage 314 and bore 243. At this time the upper end of the socket 257 is open to the pressure existing in the top of the power cylinder 26. Also at this time, the lower end of socket 257 is open to pump pressure through passages 249A, 249, 248, 247, 246, groove 245, the upper end of passage 243 and passage 313, groove 83, ports 312 and 213, groove 82 and passages 215 and 98.

As soon as ram has descended in a power stroke far enough to permit weight 187 to move sleeve 181 downward to the lowermost position thereof, ports 312 will be sealed off and groove 83 will communicate with groove 178 which is in constant communication with reservoir 25. The upper end of bore 243 will now be connected with reservoir 25 and the valve 311 will move upwardly in response to top cylinder pressure flowing into the space beneath valve 311 from bore 243 through transverse and longitudinal openings 315 and 316 provided in the lower portion of valve 311. When valve 311 is elevated, communication between the upper end of socket 257 and passage 239 through bore 243 is interrupted while communication between passage 239 and passage 246 through bore 243 is established. In this manner the lower end of socket 257 is exposed to fluid at the pressure existing in the top of cylinder 26.

Upon the termination of a series of short strokes by ram 44 and when stroke counting spool 258 is in a depressed position determined by stop 270, valve 305 will be operated to admit fluid at pump pressure into the upper end of socket 257 to hold spool 258 in the lowered position. This spool is held in this position at this time to prevent the admission of fluid from the lower end of chamber 224 and downward movement of plunger 225 which if permitted would cause another short stroke by the ram. Before the ram has completed its cycle of movement it is necessary to reset the stroke counter for a succeeding cycle of operation.

This resetting takes place when, in the upward movement of ram 44, bar 47 lifts weight 187 and permits spring 188 to move sleeve 181 to its uppermost position in which groove 83 will be cut off from communication with groove 178 but will be connected by ports 312 and passage 313 with the upper end of bore 243. When this connection takes place, valve 311 will be again depressed and the upper end of socket 257 connected with the top cylinder passage which at this time is connected with reservoir 25. At this time also, both ends of valve stem 304 are exposed to the pressure existing in the top cylinder passages and spring 310 will operate to move the valve 304 to a closed position. When valve 311 is depressed the end of socket 257 below spool 258 is exposed to pump pressure as previously outlined. This pump pressure on the under side of spool 258 will quickly move the spool to the upper end of socket 257 in place for the next succeeding cycle of operation.

During the operation of the press, air which has been entrained in the oil sometimes gravitates to the highest point in the hydraulic system which is at the upper end of the bore 62 in cap 123. This air, unless removed, interferes with the operation of the inching control, preventing this device from operating as intended. To remove this air, the cap 123 (see Fig. 7) is provided with a bore 317 which slidably receives a valve plunger 318; this plunger is normally urged downward by a coil spring 320 disposed within a socket formed in the plunger 318. This plunger has a plurality of openings 321 and 322 spaced longitudinally thereof, the former openings being disposed below the lower end of the bore 317 when the plunger is in its normal position. At this time air accumulating in the cap 123 may flow through the openings 321, upwardly through the socket formed in plunger 318 and accumulate at the upper end of the bore 317. This end of the bore is connected by a diagonal passage 323 with the passage 150 formed in the cap 123 in registration with the bore 63, this passage also extends laterally and is connected by a tube 151 with the reservoir.

Under normal conditions of operation, some fluid escapes from the system by flowing upwardly in the bore 62 to the chamber 159 in cap 123, this fluid flows through the openings 321 in plunger 318 and upwardly through bore 317 to the upper end of passage 323. This fluid then flows through passage 150 to tube 151 through which it flows to the reservoir, this fluid picks up the air accumulated at the upper end of bore 317 and carries it to the reservoir where it will be exhausted to the atmosphere. When spool 124 is elevated to operate the inching control, bolt 166 will move valve plunger 318 upwardly until ports 321 are closed. Fluid then in recess 159 will be exhausted (see Figures 6C and 8) through passage 324 to ports 157 in sleeve 127. Fluid flowing through these ports to the lower end of the interior of sleeve 127 exerts an upward force on piston 152 which transmits this force to the shuttle valve 145. By controlling the movement of spool 124 the distance moved by shuttle valve 145 will also be controlled. The degree of opening movement of the shuttle valve 145 relative to ports 133 which admit fluid to the upper end of the power cylinder may thus be controlled, the desired volume of fluid being admitted to move ram 44 downward at the rate and to the distance required. When the ram has moved sufficiently, spool 124 may be manipulated to hold the ram at this point or to release the same for return to starting position. When spool valve 124 is returned to its normal position, determined by the movement of head 165 in thimble 164 ports 321 will be again open to permit the escape of air as previously pointed out.

Valve spool 124 is manually moved by operating the hand lever 41 located on the side of the control panel 35 of the press. This hand lever is connected with a rock shaft 325, see Fig. 18, on which a sprocket 326 is provided, this sprocket 326 receives an endless chain 327 which is in turn trained around a second sprocket 328 mounted on a shaft 330 journalled in casing 60; the inner end of this shaft carries the disk 168 with the eccentrically located pin, previously designated by the numeral 169. This pin receives the connecting link 170 by which motion of the pin 169 is transmitted to the spool 124. The control handle may be moved in either direction to raise or lower the spool 124. If turned far enough to swing the eccentric pin 169 past the vertical center line of the spool 124 the spring 163 will tend to return the spool 124 toward its normal position, this movement also tending to revolve disk 168. Since movement of disk 168 in this direction is limited, the spool will be held in its lower position which will cause the press to continue to cycle automatically.

Figure 18:
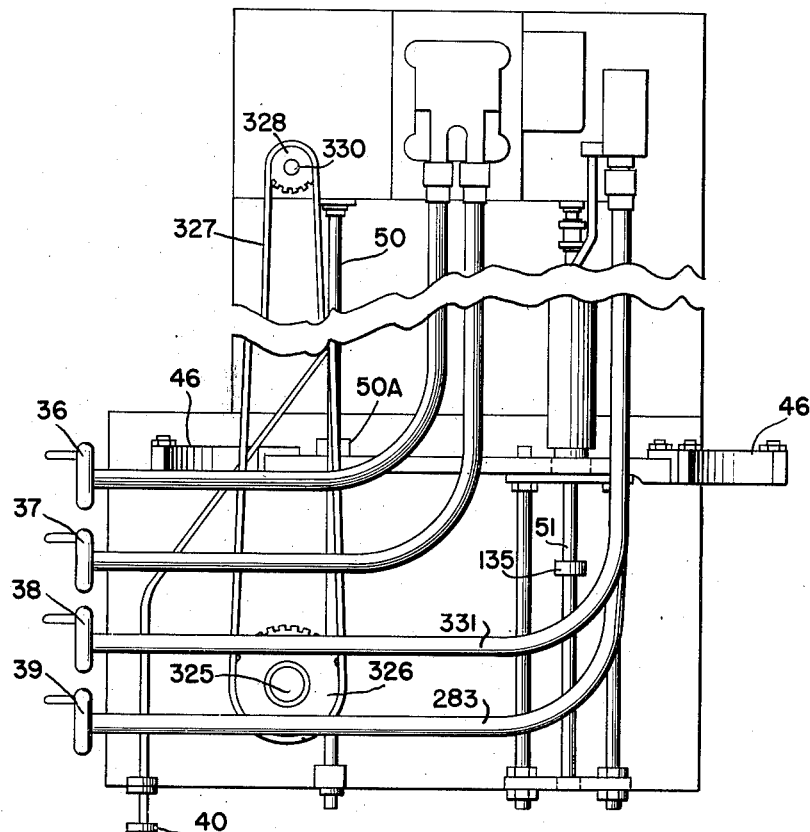
Figure 18 is a view in side elevation of the valve and control mechanism therefor.
Figure 19:
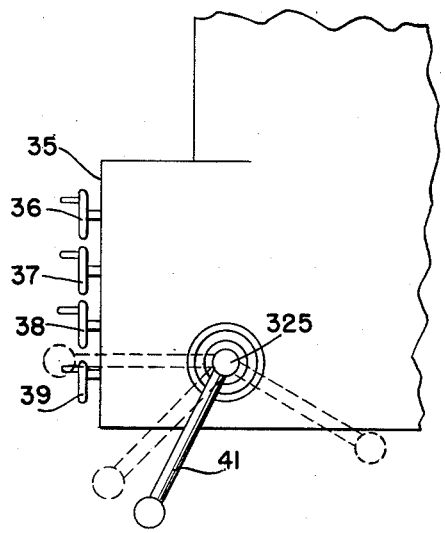
Figure 19 is a side elevational view of a manual controlling element employed in the press showing the same in one position in full lines and in other positions of operation in dotted lines.

As illustrated in Figs. 1, 2 and 18, a pair of controls 36 and 37 are provided for the relief valves 276 and 287. The adjustment of these controls varies the tension of the control springs for the relief valves and consequently the pressures at which the relief valves will be operated to discharge fluid to the reservoir.

The control panel 35 is also provided with control devices 39 and 40, respectively, for regulating the number of short reciprocations or vibratory strokes to be executed by the ram during each cycle and the distance travelled by the ram during these short reciprocations. The control 39 is connected with the lower end of the adjusting screw 270A for post 261 and serves, upon adjustment, to rotate the member 261 to cause the stop device 270 to move up or down in the socket 257. If the member 270 is moved downward in the socket more reciprocatory strokes will be executed by the ram. If moved downward as far as possible the ram may be caused to continuously execute short strokes. When member 270 is disposed in its uppermost position wherein it is shown in Figs. 6, 9 and 10, no short strokes will be executed by the ram. The control 40 for regulating the length of short stroke consists of a push-pull cable which may be adjusted and locked in desired position. If the knob 40 is adjusted to pull downwardly on the cable, the lever will be depressed causing the cam shaft 281 to revolve and move a push pin 282 into engagement with the outer end of valve 254 causing this valve to move in opposition to its spring and reduce the effective area of port 253. By reducing the area of this port the rate at which fluid may be exhausted from the lower end of chamber 224 will be reduced and it will therefore take a longer time for plunger 225 to be depressed. Since the ram moves in an upward direction when plunger 225 is elevated, this upward movement will be prolonged by reducing the effective size of port 253 and increasing the length of time required for plunger 225 to be lowered. When plunger 225 has moved downward far enough to permit communication between grooves 231 and 273 the shuttle valve 145 will be elevated to direct pressure fluid to the upper end of the power cylinder to cause the ram to again move in a downward direction. It should be obvious that through the adjustment of knob 40 the length of the short strokes may be effectively controlled.

The control panel also contains a device 38 for varying the effectiveness of the flow control spool 201, this adjustment includes (see Figures 10 and 18) an operating member 38 connected by a flexible shaft 331 with an adjusting screw 332 for moving the valve 208 vertically in the block 197. When the adjusting screw 332 is moved inwardly valve 208 will be moved toward a closed position, this partial closure tends to resist the flow of fluid from passage 195 to passage 198 causing a pressure drop on opposite sides of the orifice. The higher pressure of the pressure drop will be transmitted to the underside of the flow control spool 201. The volume of fluid by-passed to the tank by the flow control mechanism will be proportional to the degree of opening of the orifice regulated by the valve 208.

Section A of the valve mechanism includes a block 84 in which drilled holes 119, 120 and 121 are formed. Holes 120 and 121 are formed with pipe taps at their juncture and at their outer ends. When set for operation as a fully automatic control valve for a press, hole 120 is provided with a plug 335 so that fluid supplied to hole 119 will flow through line 120 and 121 to initiate the operation of the ram as previously described.

Figure 22:
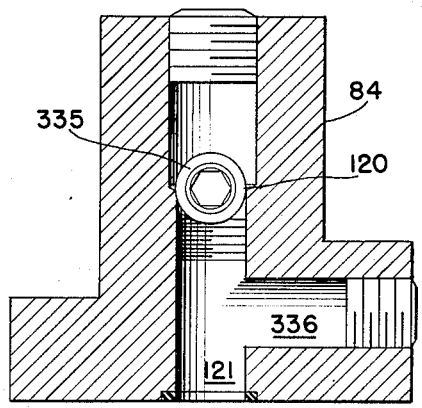
Fig. 22 is a detail horizontal sectional view taken through a connection block attached to the front of and forming a part of the automatic control valve mechanism on the plane indicated by the line XXII—XXII of Fig. 7.

In some instances it is desired to make the valve mechanism semi-automatic in operation and to control the operation of the ram by an attachment or accessory. To accomplish this manner of control, the plugs (Figures 7 and 22) are removed from the outer ends of holes 120 and 121, and plug 335 is transferred from hole 120 to the tap in hole 121. The line leading to the accessory is connected to the lower end of hole 120; the plugs are then replaced in the outer and upper ends of holes 121 and 120, respectively, and a line extending from the accessory is connected with the outer end of a passage 336 which enters the block 84 from the side and communicates with hole 121 at the inner end of the plug 335. An example of an accessory which might be used is a feeding device of the type shown in the copending application of Cecil E. Adams, Serial No. 682,974 filed July 11, 1946, now Patent No. 2,512,731, issued June 27, 1950. When the valve mechanism is set up for semi-automatic operation and the manual control spool 124 is disposed to cause continuous cycling, each actuation of the sleeve 127 by the press ram at the termination of the return stroke will direct fluid from the inlet line into holes 119 and 120. This fluid will flow through the line connected to the lower end of hole 120 and effect a cycle of operation of the accessory. At the conclusion of such cycle fluid supplied to the accessory will be directed back to the valve mechanism through the line connected with hole 336. This fluid will flow through hole 121, grooves 65, 125 and 64 and passage 118 to groove 70 from which it will flow through ports 128 to the interior of sleeve 127 beneath the shuttle valve 145. This fluid will move shuttle valve upward to initiate the next operation of the press ram. The initial movement of the ram permits sleeve 127 to be depressed to a point where fluid flow through ports 131 to groove 72 and consequently to holes 119 and 120 will be discontinued. This flow will be resumed when the sleeve 127 is elevated at the termination of the next return stroke of the ram.

It should be obvious that no alteration of the mechanism is necessary in converting the control valve mechanism from fully automatic to semi-automatic and vice versa except the removal, shifting and replacement of pipe plugs. This latter action may be accomplished when it is desired to operate the press ram without operating the accessory even though the press may be equipped with the same.

While the form of embodiment of the present invention as herein disclosed constitutes a preferred form, it is to be understood that other forms might be adopted, all coming within the scope of the claims which follow.

We claim:

1. In a hydraulic press, a body forming a reservoir; a cylinder member having piston chamber mounted within said reservoir and extending through the open upper end thereof; a piston disposed for movement in said piston chamber; a second body mounted on the upper end of said cylinder member above said reservoir; valve casing means secured to said second body, said cylinder member, said second body and said valve casing forming passages providing a hydraulic system communicating with said reservoir; a fluid pump mounted above said valve casing and communicating therewith and with said reservoir; a reversing valve in said casing operative to control flow from said pump to said cylinder and reservoir; and a motor mounted on said second body, said motor having a driving connection with said fluid pump, said second body with said motor, said valve casing and said pump being removable from and replaceable as a unit on said cylinder member.

2. In a hydraulic press, a body forming a reservoir; a cylinder with a piston chamber disposed within said body and forming an inner wall of said reservoir, said cylinder extending upwardly through the open top of said reservoir; a motor support connected to the upper end of said cylinder member, said motor support and cylinder forming passages leading to the ends of said piston chamber; a piston disposed for reciprocation in said piston chamber; a sub-plate attached to one end of said motor support; control valve mechanism secured to said sub-plate, said valve mechanism having a plurality of body sections secured to side surfaces of said sub-plate, said valve body sections and sub-plate forming a valve chamber with inlet, outlet and cylinder passages communicating therewith, the cylinder passages communicating with the passages in said motor support; a pump mounted on said sub-plate with the inlet thereof communicating with said reservoir and the outlet communicating with the inlet passage formed in said valve body and sub-plate; a motor mounted on said motor support, said motor having a driving connection with said pump; and a reversing valve disposed for movement in the valve chamber to selectively connect inlet and outlet passages with said cylinder passages.

3. In a hydraulic press, a body forming a reservoir; a cylinder with a piston chamber disposed within said body and forming an inner wall of said reservoir, said cylinder extending upwardly through the open top of said reservoir; a motor support connected to the upper end of said cylinder member, said motor support and cylinder forming passages leading to the ends of said piston chamber; a piston disposed for reciprocation in said piston chamber; a sub-plate attached to said motor support; control valve mechanism having a plurality of body sections secured to said sub-plate, said valve body sections having a valve chamber; a pump mounted on said sub-plate; a reversing valve disposed for movement in said valve chamber to control the movement of said piston in said cylinder; said valve body sections, said sub-plate, said motor support and cylinder constituting a unit forming communicating passages establishing a hydraulic system communicating with said reservoir, said pump, said cylinder and said control valve mechanism.

4. In a hydraulic system having a source of fluid pressure and a reversible fluid motor, means for controlling the flow of fluid from said source to said motor comprising a reversing valve; means for momentarily applying fluid from said source to said reversing valve to initiate a cycle of operation of said motor; means for obstructing exhaust flow from said motor and combining the same with fluid supplied to said motor to cause rapid operation thereof, the blocking of said exhaust causing a back pressure; means for applying such back pressure to said reversing valve to retain the same in position to cause forward operation of said motor; means operated by said motor at a predetermined stage of forward operation to render said obstructing means inoperative; and a second means offering limited obstruction to exhaust flow from said motor when said first blocking means is rendered inoperative, said second means creating a back pressure to retain said reversing means in position to continue forward operation of said motor after said first obstructing means has been rendered inoperative.

5. In a hydraulic system, a reservoir; a pump; a reversible fluid motor; mechanism for controlling the operation of said motor, said mechanism having an inlet line connected with said pump, an outlet line connected with said reservoir and first and second work lines connected with said motor; spool means in said mechanism responsive to fluid pressure to connect said inlet line with the first work line and said outlet line with the second work line; a second spool means in said mechanism operative in one position to interrupt fluid flow through said outlet line, said interruption causing a back pressure; a conduit connecting the second work line with said inlet line; a check valve in said conduit to prevent fluid flow from said inlet to said second work line; means operated by said motor at a predetermined stage for moving said second spool to a position to permit fluid flow through said outlet line; and an orifice in said outlet line between said second spool and said reservoir, said second spool and orifice successively causing back pressure in said outlet line to retain said first spool in position to connect said inlet line and said first work line.

6. In a hydraulic system, a source of fluid pressure; a fluid motor having a cylinder and piston reciprocable therein; means for controlling the reciprocations of said piston comprising a valve body connected with said fluid pressure source; valve means in said body operative to alternately direct fluid to the opposite ends of said cylinder to cause the reciprocation of said piston, said valve means being responsive to fluid pressure to cause movement of said piston in a certain direction; and manually actuated pressure generating means for selectively applying pressure to said valve means to effect limited movement of said piston.

7. In a hydraulic system, a source of fluid pressure; a fluid motor having a cylinder and piston reciprocable therein; means for controlling the reciprocations of said piston comprising a valve body connected with said fluid pressure source; valve means in said body operative to alternately direct fluid to the opposite ends of said cylinder to cause the reciprocation of said piston, said valve means being responsive to fluid pressure to cause movement of said piston in a certain direction; control means operated in one manner to apply fluid from said pressure source to said valve means to place the same in position to cause movement of said piston in said certain direction; and fluid pressure generating means operative when said control means is operated in a second manner to selectively apply pressure to said valve means.

8. In a hydraulic system, a source of fluid pressure; a fluid motor having a cylinder and piston reciprocable therein; means for controlling the reciprocations of said piston comprising a valve body connected with said fluid pressure source; valve means in said body operative to alternately direct fluid to the opposite ends of said cylinder to cause the reciprocation of said piston, said valve means being responsive to fluid pressure to cause movement of said piston in a certain direction; control means actuated in one manner to apply fluid from said pressure source to said valve means to place the same in position to cause movement of said piston in said certain direction; and hydraulic motion transmitting means operative when said control means is actuated in a second manner to transmit motion from said control means directly to said valve means.

9. In a hydraulic system, a source of fluid pressure; a fluid motor having a cylinder and piston reciprocable therein; means for controlling the reciprocations of said piston comprising a valve body connected with said fluid pressure source; valve means in said body operative to alternately direct fluid to the opposite ends of said cylinder to cause the reciprocation of said piston, said valve means being responsive to fluid pressure to cause movement of said piston in a certain direction; control means operative when actuated in one manner to apply fluid from said source to said valve means to initiate the movement of said piston in said direction; means for resisting exhaust flow from said cylinder during movement of said piston in said direction to create back pressure, said back pressure being applied to said valve means to retain the same in position to cause movement of said piston in said direction; means for moving said valve means to a position to cause reverse movement of said piston when said back pressure is reduced; hydraulic means for transmitting motion from said control means to said valve means when said control means is actuated in a second manner to cause movement of said piston in said direction; and means operated by said control means when actuated in said second manner to prevent the building of back pressure.

10. In a hydraulic system, a source of fluid pressure; a fluid motor having a cylinder and piston reciprocable therein; means for controlling the reciprocations of said piston comprising a valve body connected with said fluid pressure source; valve means in said body operative to alternately direct fluid to the opposite ends of said cylinder cause the reciprocation of said piston, said valve means being responsive to fluid pressure to cause movement of said piston in a certain direction; control means operative when actuated in one manner to apply fluid from said source to said valve means to initiate the movement of said piston in said direction; means operative during a portion of the movement of the piston in said direction to divert fluid exhausted from the end of said cylinder toward which said piston is moving into the other end thereof to cause rapid movement of said piston; hydraulic means for transmitting motion from said control means to said valve means when said control means is actuated in a second manner, to cause movement of said piston in said direction; and means operated by said control means when actuated in said second manner to prevent the operation of said flow diverting means.

11. In a hydraulic system, a source of fluid pressure; a reversible fluid motor; control means between said pressure source and said motor, said control means having a reversing valve responsive to fluid pressure to cause forward operation of said fluid motor; pressure-responsive valve means operative substantially simultaneously with the initiation of reverse operation of said motor to apply fluid pressure from said source to said reversing valve to cause a resumption of forward operation by said motor; means operated by fluid pressure for placing said valve means in inoperative condition after a predetermined number of successive operations thereof, said last-mentioned means being operated by said valve means; and means controlled by said motor at the conclusion of a cycle of operation for restoring said valve means to an operative condition.

12. In a hydraulic system, a source of fluid pressure; a reversible fluid motor; control means between said pressure source and said motor, said control means having a reversing valve responsive to fluid pressure to cause forward operation of said fluid motor; a valve element disposed for movement between a position to apply fluid pressure from said source to said reverse valve and a position interrupting such pressure application, said element being moved to the former position when said motor operates in a reverse direction and to the latter position when said motor operates in a forward direction; and a fluid operated mechanism for regulating the number of operations of said valve element, said valve element supplying a predetermined quantity of fluid to said regulating mechanism during movement toward one position.

13. In a hydraulic system, a source of fluid pressure; a reversible fluid motor; control means between said pressure source and said motor, said control means having a reversing valve responsive to fluid pressure to cause forward operation of said fluid motor; a spool valve supported for sliding movement between a position to apply fluid pressure from said source to said reverse valve and a position interrupting such pressure application, said spool valve being moved to the former position when said motor operates in a reverse direction and to the latter position when said motor operates in a forward direction; and a fluid operated counting mechanism for interrupting the operation of said spool valve after a predetermined number of operations have been executed, said spool valve serving as a piston to supply a predetermined quantity of fluid to said counting mechanism during each movement toward one position.

14. In a hydraulic system, a source of fluid pressure; a reversible fluid motor; control means between said pressure source and said motor, said control means having a reversing valve responsive to fluid pressure to cause forward operation of said fluid motor; a spool valve supported for sliding movement between a position to apply fluid pressure from said source to said reverse valve and a position interrupting such pressure application, said spool valve being moved to the former position when said motor operates in a reverse direction and to the latter position when said motor operates in a forward direction; means for controlling the rate of movement of said spool valve from the latter to the former position; and a fluid operated counting mechanism for interrupting the operation of said spool valve after a predetermined number of operations have been executed, said spool valve serving as a piston to supply a predetermined quantity of fluid to said counting mechanism during each movement toward one position.

15. In a hydraulic system, a source of fluid pressure; a reversible fluid motor; control means between said pressure source and said motor, said control means having a reversing valve responsive to fluid pressure to cause forward operation of said fluid motor; a spool valve supported for sliding movement between a position to apply fluid pressure from said source to said reverse valve and a position interrupting such pressure application, said spool valve being moved to the former position when said motor operates in a reverse direction and to the latter position when said motor operates in a forward direction; a fluid operated counting mechanism for interrupting the operation of said spool valve after a predetermined number of operations have been executed, said spool valve serving as a piston to supply a predetermined quantity of fluid to said counting mechanism during each movement toward one position; and means for adjusting said counting mechanism to vary the number of operations of said spool valve.

16. In a hydraulic system, a source of fluid pressure; a reversible fluid motor; control means between said pressure source and said motor, said control means having a reversing valve responsive to fluid pressure to cause forward operation of said fluid motor; a spool valve supported for sliding movement between a position to apply fluid pressure from said source to said reverse valve and a position interrupting such pressure application, said spool valve being moved to the former position when said motor operates in a reverse direction and to the latter position when said motor operates in a forward direction; a fluid operated counting mechanism for interrupting the operation of said spool valve after a predetermined number of operations have been executed, said spool valve serving as a piston to supply a predetermined quantity of fluid to said counting mechanism during each movement toward one position; and means for rendering said counting mechanism ineffective to interrupt the operation of said spool valve.

17. In a hydraulic press, a source of fluid pressure; a fluid motor having a cylinder and a piston disposed for reciprocation therein; control mechanism between said motor and said fluid pressure source, said control mechanism having a spool valve with a head-like enlargement, said valve being movable between positions in which fluid from said pressure source is alternately directed to the ends of said cylinder and from the opposite end to exhaust to cause the reciprocation of said piston; cylinder means formed for reception of the head-like enlargement on said spool valve when the latter occupies the position to direct fluid from said source to a predetermined end of said cylinder; an exhaust line at one end of said second-mentioned cylinder means; a vent line at the opposite end thereof; and means tending to urge said spool valve from the position in which said head is disposed in said cylinder, said means being resisted by the pressure surge caused when said valve moves toward the position establishing communication between said predetermined cylinder end and said exhaust line.

18. In hydraulic apparatus, a hydraulic system having a source of fluid pressure, a fluid motor; control mechanism between said motor and said pressure source; flow control mechanism responsive to fluid pressure differentials to govern the rate of operation of said motor; means cooperating with said control mechanism to cause repeated abbreviated cycles of operation of said motor; and valve means operated by said last-mentioned means to interrupt the operation of said flow control mechanism after a predetermined number of cycles of operation of said motor have been executed.

19. In hydraulic apparatus, a hydraulic system having a source of fluid pressure; a fluid motor; control mechanism between said motor and said pressure source, said mechanism being operative to alternately cause forward and reverse operation of said motor; means having a valved fluid conductor operative to combine the discharge from said motor when operating in one direction with fluid supplied by said source to effect rapid operation of said motor; means operated by said motor at a predetermined stage of operation for interrupting the operation of said valved fluid conductor; flow control mechanism rendered effective by said last named means and responsive to fluid pressure differentials to govern the rate of operation of said motor; means having a valve element and cooperating with said control mechanism to cause repeated cycles of operation of said motor; and a counting device operated by said last-named means for determining the number of cycles of operation of said motor, said counting device being operative to render said flow control mechanism ineffective after a predetermined number of cycles of operation of said motor.

20. In a hydraulic press, a source of fluid pressure; a fluid motor having a cylinder and a piston disposed for reciprocation therein; control mechanism between said motor and said fluid pressure source, said control mechanism having a reversing valve movable between positions in which fluid from said pressure source is alternately directed to the ends of said cylinder and from the opposite end to exhaust to cause the reciprocation of said piston; means tending to urge said valve toward one of said position; and means responsive to the pressure surge in the exhaust, when said valve moves toward the position to connect a predetermined end of said cylinder thereto, to resist movement of said reversing valve by said urging means.

21. In hydraulic apparatus, a source of fluid pressure; a reversible fluid motor; control mechanism between said motor and said fluid pressure source, said control mechanism having a valve element movable between positions in which fluid from said pressure source is alternately applied to different portions of said motor to effect forward and reverse operation thereof; and means responsive to the pressure surge in the exhaust, when said valve moves toward a position to apply fluid pressure to a portion of said motor to cause operation thereof in a predetermined direction, to resist movement of said valve element toward said position.

22. In a hydraulic system, a source of fluid pressure; a power cylinder with a piston and ram disposed for reciprocation therein; a reversing valve between said pressure source and said power cylinder, said reversing valve being operative to alternately connect the ends of said cylinder with said pressure source and exhaust; a valve element for obstructing exhaust flow from said cylinder when said piston and ram are moving in a certain direction; passage means for combining such exhaust fluid with fluid flowing from said pressure source to said power cylinder to increase the rate of movement of said piston and ram; means operative at a predetermined stage of movement of said piston and ram for rendering said obstructing valve means inoperative and directing the fluid flowing from said cylinder to exhaust; orifice means through which the fluid passes while flowing to exhaust, said orifice creating a pressure drop; and a flow control spool responsive to the pressure drop caused by said orifice to divert some of the fluid from said pressure source directly to exhaust to reduce the rate of movement of said piston and ram.

23. In a hydraulic system, a source of fluid pressure; a power cylinder with a piston and ram disposed for reciprocation therein; a reversing valve between said pressure source and power cylinder, said reversing valve being responsive to fluid pressure to initiate the movement of said piston and ram in one direction; means for obstructing exhaust flow from said power cylinder when said piston is moving in such direction to create back pressure, said back pressure being applied to said reversing valve to continue the movement of said piston and ram in such direction; flow conducting means responsive to such back pressure to combine exhaust flow from said power cylinder with fluid flowing from said pressure source to said power cylinder to increase the rate of movement of said ram and piston; means operative at a predetermined stage of movement of said piston and ram for rendering said flow obstructing means inoperative and directing the fluid flowing from said cylinder to exhaust; a second means having an orifice for resisting the flow from said cylinder to exhaust to maintain a back pressure when said first resisting means has been rendered inoperative; and means for yieldably retaining said second resisting means in a normal operating position, said last-named means being responsive to excessive exhaust fluid pressure to cause the exhaust fluid to by-pass said orifice.

24. In a hydraulic system, a source of fluid pressure; a power cylinder with a piston and ram disposed for reciprocation therein; a reversing valve between said pressure souce and said power cylinder, said reversing valve being responsive to fluid pressure to initiate movement of said piston and ram in one direction; means for obstructing exhaust flow from said power cylinder when said piston and ram are moving in such direction to create back pressure, said back pressure being applied to said reversing valve to continue the movement of said piston and ram in such direction; flow conducting means responsive to such back pressure to combine exhaust flow from said power cylinder with fluid flowing from said pressure source to said power cylinder to increase the rate of movement of said piston and ram; a flow control mechanism having an orifice for creating a pressure differential on fluid flowing to exhaust and a valve element responsive to the pressure differential to divert some of the fluid from said pressure source directly to exhaust to reduce the rate of movement of said piston and ram; and means operative at a predetermined stage of movement of said piston and ram for rendering said exhaust flow obstructing means inoperative and directing exhaust fluid from said cylinder through the orifice of said flow control mechanism, the back pressure caused by said orifice serving to retain said reversing valve in position to continue the movement of said piston and ram in such direction after said exhaust flow obstructing means has been rendered inoperative.

25. In a hydraulic system, a source of fluid pressure; a power cylinder with a piston and ram disposed for reciprocation therein; a reversing valve between said pressure source and said power cylinder, said reversing valve being responsive to fluid pressure to initiate movement of said piston and ram in one direction; means for obstructing exhaust flow from said power cylinder when said piston and ram are moving in such direction to create back pressure, said back pressure being applied to said reversing valve to continue the movement of said piston and ram in such direction; flow conducting means responsive to such back pressure to combine exhaust flow from said power cylinder with fluid flowing from said pressure source to said power cylinder to increase the rate of movement of said piston and ram; a flow control mechanism having an orifice for creating a pressure differential on fluid flowing to exhaust and a valve element responsive to the pressure differential to divert some of the fluid from said pressure source directly to exhaust to reduce the rate of movement of said piston and ram; means operative at a predetermined stage of movement of said piston and ram for rendering said exhaust flow obstructing means inoperative and directing exhaust fluid from said cylinder through the orifice of said flow control mechanism, the back pressure caused by said orifice serving to retain said reversing valve in position to continue the movement of said piston and ram in such direction after said exhaust flow obstructing means has been rendered inoperative, a second means for obstructing exhaust flow when said first-mentioned obstructing means has been rendered inoperative, said second obstructing means having a second orifice to cause back pressure to maintain the position of the reversing valve to continue such motion of said piston and ram when the orifice of the flow control mechanism is ineffective; and means yieldably urging said second obstructing means into operative position, said yieldable urging means being responsive to excessive back pressure to render said second obstructing means inoperative.

26. In a hydraulic system, a source of fluid pressure; a power unit with a piston and ram disposed for reciprocation; control mechanism between said pressure source and said power unit, said control mechanism having a reversing valve normally disposed to cause movement of said piston and ram in one direction and responsive to fluid pressure to cause movement of said piston and ram in the opposite direction; and a member manually actuated in one manner to apply fluid pressure from said source to said reversing valve to move the same to a position to permit substantially unrestricted flow from said pressure source to said power unit, said member being manually actuated in a second manner to prevent the application of fluid pressure from said source to said reversing valve and effect selective movement thereof to secure controlled flow from said pressure source to said power unit.

27. In a hydraulic system, a source of fluid pressure; a power unit with a piston and ram disposed for reciprocation; control mechanism between said pressure source and said power unit, said control mechanism having a reversing valve; means for receiving pressure fluid from said source to move said reversing valve to a position permitting unrestricted fluid flow from said pressure source to said power unit; a member responsive to manual movement in one manner to connect said pressure receiving means with said pressure source, said member being responsive to manual movement in a second manner to render said pressure receiving means inoperative; and means operative when said member is moved in the second manner to impart limited movement to said reversing valve to establish controlled flow of pressure fluid from said source to said power unit.

28. In a hydraulic system, a source of fluid pressure; a power unit with a piston and ram disposed for reciprocation; control mechanism between said pressure source and said power unit, said control mechanism having a reversing valve; a pressure receiving chamber adjacent said reversing valve; a manually actuated member operative in one position to direct fluid pressure from said source to said pressure receiving chamber, said member being operative when in a second position to connect said chamber with exhaust; and a piston member adjacent said reversing valve, said piston member being responsive to fluid displaced when said manually actuated member is moved beyond said second position to impart controlled movement to said reversing valve.

29. In a hydraulic system, a source of fluid pressure; a power unit with a piston and ram disposed for reciprocation; control mechanism between said pressure source and said power unit, said control mechanism having a reversing valve; a pressure receiving chamber adjacent said reversing valve; a second chamber; a member disposed in said second chamber for movement in opposite directions, movement of said member in one direction serving to connect said first-mentioned chamber with said pressure source, movement of said member in the opposite direction serving to connect said first-mentioned chamber with exhaust and displace fluid from said second chamber; and a piston member adjacent said reversing valve, said piston member being actuated by fluid displaced by said member to impart controlled movement to said reversing valve.

30. In a hydraulic system, a source of fluid pressure; a power unit having a reciprocably mounted piston and ram; control mechanism disposed between said pressure source and said power unit, said control mechanism having a spool valve normally yieldably urged to a first position to direct fluid from said pressure source to said power unit to cause movement of said piston and ram in one direction, said spool valve being movable to another position to direct fluid from said source to said power unit to cause movement of said piston and ram in the opposite direction; a second piston disposed at one end of said spool valve; a chamber; a second spool valve disposed in said chamber for movement in opposite directions, movement of said second spool valve in one direction serving to connect the space between said first-mentioned spool valve and said second piston with said pressure source to admit fluid to move said first-mentioned spool valve, movement of said second spool valve in the opposite direction serving to connect such space with exhaust and displace fluid from said chamber; and means for directing the fluid displaced from said chamber by said second spool valve against said second piston to impart controlled movement to said second spool valve.

31. In a hydraulic system, a source of fluid pressure; a power unit having a reciprocably mounted piston and ram; control mechanism disposed between said pressure source and said power unit, said control mechanism having a reversing valve normally yieldably held in a first position to direct fluid from said pressure source to said power unit to cause movement of said piston and ram in a first direction and movable by fluid pressure to a second position to direct fluid from said source to said power unit to cause movement of said piston and ram in a second direction; a chamber adjacent said reversing valve for receiving pressure fluid to effect movement thereof to said second position; a fluid conductor extending from said pressure source to said chamber; and a valve member for controlling fluid flow through said conductor; said valve member being biased by fluid pressure toward an open position when said reversing valve is in its first position and toward a closed position when said reversing valve is in its second position.

32. In a hydraulic system, a source of fluid pressure; a power unit having a reciprocably mounted piston and ram; control mechanism disposed between said pressure source and said power unit, said control mechanism having a reversing valve normally yieldably held in a first position to direct fluid from said pressure source to said power unit to cause movement of said piston and ram in a first direction and movable by fluid pressure to a second position to direct fluid from said source to said power unit to cause movement of said piston and ram in a second direction; a chamber adjacent said reversing valve for receiving pressure fluid to effect movement thereof to said second position; a fluid conductor extending from said pressure source to said chamber; a second valve member for controlling fluid flow through said conductor; said valve member being biased by fluid pressure toward an open position when said reversing valve is in its first position and toward a closed position when said reversing valve is in its second position, said second valve member displacing a predetermined quantity of fluid when moving toward an open position; and means moved in a step by step manner by fluid displaced through successive operations of said second valve, said means serving to interrupt the movement of said second valve to open position after the execution of a predetermined number of operations.

33. In a hydraulic system, a source of fluid pressure; a power unit having a reciprocably mounted piston and ram; control mechanism disposed between said pressure source and said power unit, said control mechanism having a reversing valve normally yieldably held in a first position to direct fluid from said pressure source to said power unit to cause movement of said piston and ram in a first direction and movable by fluid pressure to a second position to direct fluid from said source to said power unit to cause movement of said piston and ram in a second direction; a chamber adjacent said reversing valve for receiving pressure fluid to effect movement thereof to said second position; a fluid conductor extending from said pressure source to said chamber; a second valve member for controlling fluid flow through said conductor; said valve member being biased by fluid pressure toward an open position when said reversing valve is in its first position and toward a closed position when said reversing valve is in its second position, said second valve member displacing a predetermined quantity of fluid when moving toward an open position; and means for interrupting the movement of said second valve to open position after the execution of a predetermined number of operations, said interrupting means having a member moved a fixed distance by fluid displaced upon each operation of said second valve; and means for limiting the extent of movement of said member.

34. In a hydraulic system, a source of fluid pressure; a power unit having a reciprocably mounted piston and ram; control mechanism disposed between said pressure source and said power unit, said control mechanism having a reversing valve normally yieldably held in a first position to direct fluid from said pressure source to said power unit to cause movement of said piston and ram in a first direction and movable by fluid pressure to a second position to direct fluid from said source to said power unit to cause movement of said piston and ram in a second direction; a chamber adjacent said reversing valve for receiving pressure fluid to effect movement thereof to said second position; a fluid conductor extending from said pressure source to said chamber; a second valve member for controlling fluid flow through said conductor, said valve member being biased by fluid pressure toward an open position when said reversing valve is in its first position and toward a closed position when said reversing valve is in its second position, said second valve member displacing a predetermined quantity of fluid when moving toward an open position; means for interrupting the movement of said second valve to open position after the execution of a predetermined number of operations, said interrupting means having a member moved a fixed distance by fluid displaced upon each operation of said second valve; adjustable means for limiting the extent of movement of said member; and means for rendering said limiting means ineffective to prevent the interrupting means from discontinuing the operation of said second valve.

35. In a hydraulic system, a source of fluid pressure; a power unit having a reciprocably mounted piston and ram; control mechanism disposed between said pressure source and said power unit, said control mechanism having a reversing valve normally yieldably held in a first position to direct fluid from said pressure source to said power unit to cause movement of said piston and ram in a first direction and movable by fluid pressure to a second position to direct fluid from said source to said power unit to cause movement of said piston and ram in a second direction; a chamber adjacent said reversing valve for receiving pressure fluid to effect movement thereof to said second position; a fluid conductor extending from said pressure source to said chamber; a second valve member for controlling fluid flow through said conductor, said valve member being biased by fluid pressure toward an open position when said reversing valve is in its first position and toward a closed position when said reversing valve is in its second position, said second valve member displacing a predetermined quantity of fluid when moving toward an open position; means for interrupting the movement of said second valve to open position after the execution of a predetermined number of operations, said interrupting means having a member moved a fixed distance by fluid displaced upon each operation of said second valve; means for limiting the extent of movement of said member; and means operative adjacent the termination of movement of the piston of said power unit in one direction to restore said interrupting means to normal operating condition.

CECIL E. ADAMS.
ELLIS H. BORN.

REFERENCES CITED

The following references are of record in the file of this patent:

UNITED STATES PATENTS

| Number | Name | Date |
|---|---|---|
| 1,909,166 | Burrell | May 16, 1933 |
| 1,910,766 | Hobson | May 23, 1933 |
| 1,974,775 | Gorsuch | Sept. 25, 1934 |
| 2,026,853 | Smith | Jan. 7, 1936 |
| 2,103,984 | Indge | Dec. 28, 1937 |
| 2,210,144 | Day | Aug. 6, 1940 |
| 2,246,461 | Cannon | June 17, 1941 |
| 2,253,617 | Griffith | Aug. 26, 1941 |
| 2,267,284 | Livers | Dec. 23, 1941 |
| 2,281,276 | Ernst | Apr. 28, 1942 |
| 2,351,872 | Parker | June 20, 1944 |
| 2,367,682 | Kehle | Jan. 23, 1945 |